(12) United States Patent
Yamamoto et al.

(10) Patent No.: US 12,045,133 B2
(45) Date of Patent: Jul. 23, 2024

(54) STORAGE SYSTEM

(71) Applicant: Hitachi, Ltd., Tokyo (JP)

(72) Inventors: Takahiro Yamamoto, Tokyo (JP); Hideo Saito, Tokyo (JP); Shintaro Ito, Tokyo (JP); Sachie Tajima, Tokyo (JP); Hiroto Ebara, Tokyo (JP); Taisuke Ono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 29 days.

(21) Appl. No.: 17/940,312

(22) Filed: Sep. 8, 2022

(65) Prior Publication Data

US 2023/0236932 A1 Jul. 27, 2023

(30) Foreign Application Priority Data

Jan. 21, 2022 (JP) ................................. 2022-007873

(51) Int. Cl.
*G06F 11/10* (2006.01)
*G06F 11/07* (2006.01)
*G06F 11/14* (2006.01)

(52) U.S. Cl.
CPC ...... *G06F 11/1076* (2013.01); *G06F 11/0772* (2013.01); *G06F 11/1469* (2013.01)

(58) Field of Classification Search
CPC ............ G06F 11/1076; G06F 11/1092; G06F 11/1469; G06F 11/2094; G06F 11/08
See application file for complete search history.

(56) References Cited

U.S. PATENT DOCUMENTS

| 2005/0021627 | A1* | 1/2005 | Achiwa | G06F 11/2064 709/248 |
| 2008/0222214 | A1* | 9/2008 | Tokuda | G06F 11/1076 |
| 2010/0180153 | A1* | 7/2010 | Jernigan, IV | G06F 11/1076 711/E12.001 |
| 2011/0208994 | A1* | 8/2011 | Chambliss | G06F 11/1092 714/E11.088 |
| 2016/0285474 | A1* | 9/2016 | Miyamae | G06F 12/0868 |
| 2016/0371145 | A1* | 12/2016 | Akutsu | G06F 3/067 |
| 2022/0358008 | A1* | 11/2022 | Hu | G06F 11/1004 |

* cited by examiner

*Primary Examiner* — Yolanda L Wilson
(74) *Attorney, Agent, or Firm* — MATTINGLY & MALUR, PC

(57) ABSTRACT

In each node constituting a storage system, there is at least one of a storage area (user area) in which a user data set is stored and a storage area (parity area). For the node having the user area, there is user part difference information including information indicating whether or not to be in presence of difference for each user area of the node. For the node having the parity area, there is parity part difference information including the information indicating whether or not to be in the presence of difference for each parity area of the node. Out of the parity part difference information, the information corresponding to the parity area is the information indicating the presence of difference when there is the information indicating the presence of difference in the storage area of any of the data sets used for generating the parity stored in the parity area.

11 Claims, 17 Drawing Sheets

FIG. 1
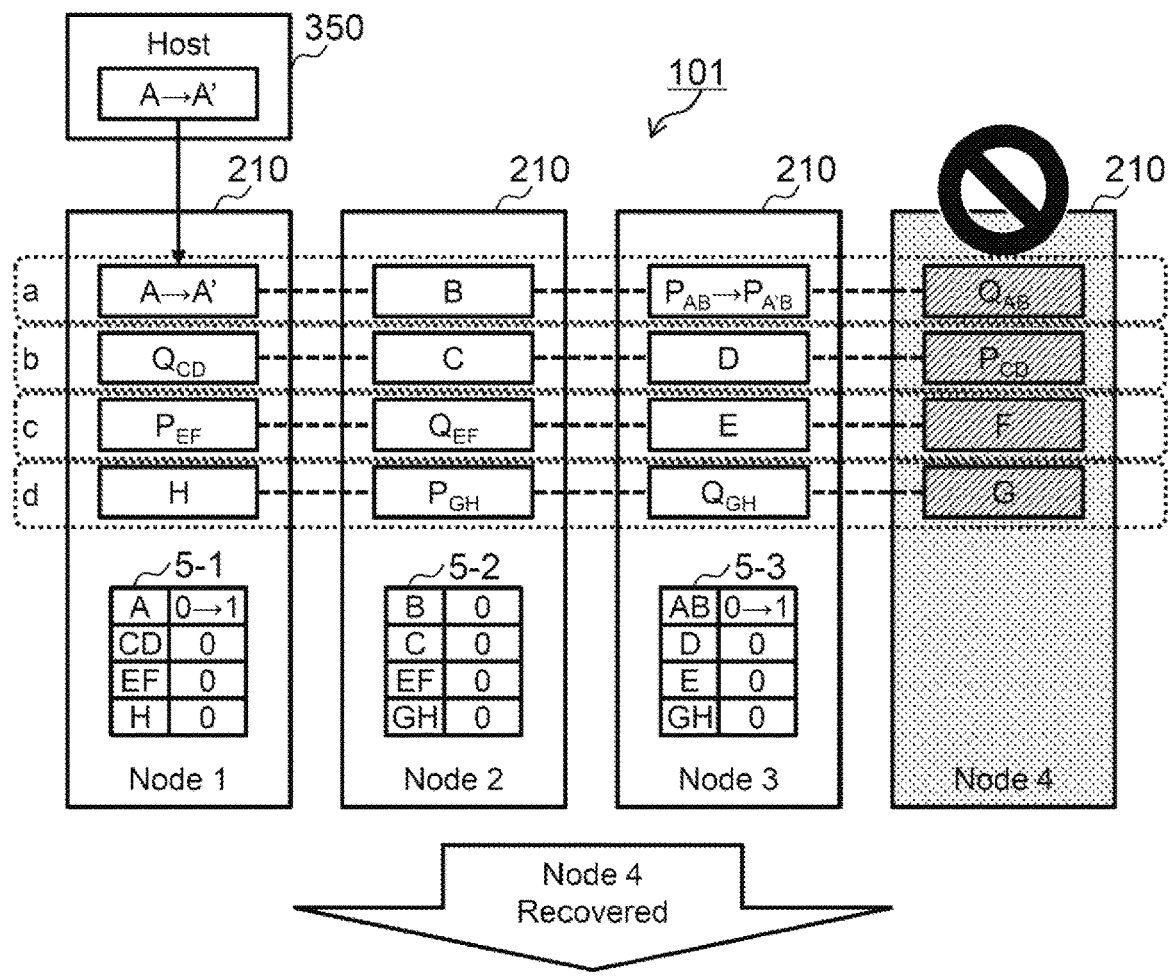
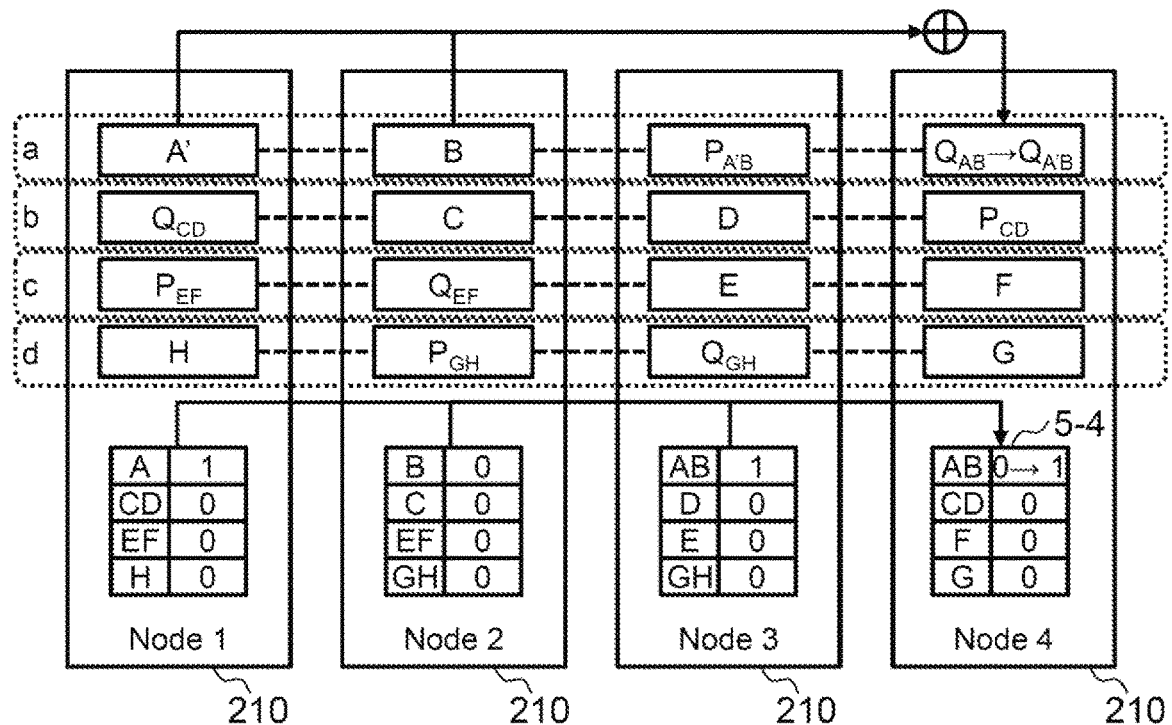

FIG. 6

STORAGE POOL MANAGEMENT TABLE (412)

STORAGE POOL INFORMATION TABLE (610)

| STORAGE POOL NUMBER | TOTAL CAPACITY (BLOCK) | CONSUMPTION CAPACITY (BLOCK) |
|---|---|---|
| 0 | 0x3A8C36096 | 0xEA30D8258 |
| 1 | ... | ... |

611, 612, 613

VIRTUAL VOLUME MANAGEMENT TABLE (620)

| VIRTUAL VOLUME NUMBER | SIZE (BLOCK) | STORAGE POOL NUMBER |
|---|---|---|
| 0 | 0x21210000 | 0 |
| 1 | 0x12301200 | 2 |
| 2 | ... | ... |

621, 622, 623

PAGE MAPPING TABLE (630)

| PAGE NUMBER | VIRTUAL VOLUME NUMBER | LBA | SIZE (BLOCK) | LOGICAL CHUNK NUMBER | LBA |
|---|---|---|---|---|---|
| 0 | 0 | 0x00000000 | 0x2000 | 0 | 0x000000 |
| 1 | 1 | 0x00000000 | 0x2000 | 0 | 0xC00000 |
| 2 | 2 | 0x06400000 | 0x2000 | 1 | 0x800000 |
| ... | ... | ... | ... | ... | ... |

PARITY GROUP MANAGEMENT TABLE — 413

LOGICAL CHUNK MANAGEMENT TABLE — 710

| LOGICAL CHUNK NUMBER | SIZE (BLOCK) | PARITY GROUP NUMBER |
|---|---|---|
| 0 | 0x8400000 | 0 |
| 1 | 0x8400000 | 2 |
| 2 | 0x8400000 | 1 |

711　712　713

PARITY GROUP MANAGEMENT TABLE — 720

| PARITY GROUP NUMBER | DATA PROTECTION SETTING | PHYSICAL CHUNK NUMBER |
|---|---|---|
| 0 | Mirror | 0, 1 |
| 1 | 3D1P | 2, 8, 3, 5 |
| 2 | 4D1P | 4, 6, 7, 9, 10 |

721　722　723

PHYSICAL CHUNK MANAGEMENT TABLE — 730

| PHYSICAL CHUNK NUMBER | START OFFSET | SIZE (BLOCK) | SITE NUMBER/ NODE NUMBER/ DRIVE NUMBER |
|---|---|---|---|
| 0 | 0x00000000 | 0xC800000 | 0 / 0 / 0 |
| 1 | 0x0C800000 | 0xC800000 | 0 / 1 / 2 |
| 2 | 0x00000000 | 0xC800000 | 1 / 3 / 0 |

| DIFFERENCE INFORMATION MANAGEMENT TABLE /414 | | |
|---|---|---|
| PHYSICAL CHUNK NUMBER | USER PART DIFFERENCE INFORMATION | PARITY PART DIFFERENCE INFORMATION |
| 0 | 011000... | 000100... |
| 1 | 000000... | 000000... |
| 2 | ... | ... |

801 802 803

STORAGE SYSTEM

CROSS-REFERENCE TO RELATED APPLICATION

The present application claims priority from Japanese application JP2022-007873, filed on Jan. 21, 2022, the contents of which is hereby incorporated by reference into this application.

BACKGROUND OF THE INVENTION

1. Field of the Invention

The present invention generally relates to rebuilding in a storage system.

2. Description of Related Art

There is known a storage system configured with a plurality of storage nodes. For example, the storage system is provided as a software defined storage (SDS) by executing predetermined software on each storage node (hereinafter referred to as a node).

As a data protection policy for this type of the storage system, erasure coding (EC), multi-stage erasure coding (MEC), a redundant array of independent nodes (RAIN), internode mirroring, or a redundant array of independent (or inexpensive) disks (RAID) can be adopted. Patent Document 1 discloses MEC as a data protection policy.

Patent Document 1 is US-A-2016/0371145.

SUMMARY OF THE INVENTION

For each of a plurality of nodes constituting a storage system, as a storage area based on a permanent storage device of the node, there is at least one of a user area which is a storage area storing a user data set as a data set and a parity area which is a storage area storing a parity as a data set. A parity stored in the parity area is a data set generated by using the data set from each of two or more nodes other than the node having the parity area.

Generally, the storage system can rebuild the data set in each of one or more failed nodes based on the data set stored in two or more surviving nodes for each storage area group (for example, a stripe) as a data protection unit. The "failed node" is a node in which a failure occurs. The "surviving node" is a node in which a failure does not occur.

When the failure is temporary, the node is eventually recovered from the failure. The node recovered from the failure has the same data as that when the node is stopped. For this reason, among the data in the recovered node, the data set that has not been updated can be used without rebuilding.

Therefore, difference rebuild is preferable as a rebuild performed when there is a recovery from a temporary failure. Specifically, when a storage area of a surviving node is updated while there is a failed node, presence of difference is managed for the storage area. After that, when the failure is recovered, the data set is rebuilt only for the storage area with the presence of difference among the nodes recovered from the failure.

For the difference rebuild, there is difference information for each node. For each node, the difference information is information indicating whether or not the storage area is the presence of difference for each storage area of the node.

Data redundancy of the storage system (maximum number of failed nodes allowed) is assumed to be k. In this case, for each node, the difference information of the node exists in k nodes. That is, the difference information is allowed to be redundant. Accordingly, even when any of the (k−1) nodes becomes a failed node, it is possible to specify which storage area is a storage area with the presence of difference by using the difference information in any of the surviving nodes.

While there is a failed node, each time the storage area is updated, the difference information is updated. For this reason, the difference information is usually stored in a memory of the node. In addition, the difference information of a plurality of nodes is stored in one node.

The size of the difference information depends on the number of storage areas in the node. In general, the number of storage areas is large in each node, and as a result, the size of the difference information is large. Since the difference information of the plurality of nodes is stored in the memory of one node, a memory usage is large. Therefore, a memory having a large capacity is required.

When the memory does not have a large capacity, the difference information of a plurality of nodes cannot be stored in the memory, and a swap from the memory to the permanent storage device occurs. Every time the storage area in a node is updated, the difference information for all the nodes retaining the difference information of the node is updated, and therefore, a swap may occur in each node.

With respect to a node having a user area, there is user part difference information which is a difference information including the information indicating whether or not to be in the presence of difference for each user area of the node. For each user area, the "presence of difference" denotes that update occurs in the user data set of the user area of the node while there is a failed node which is a node in which the failure occurs. With respect to a node having a parity area, there is parity part difference information which is a difference information including the information indicating whether or not to be in the presence of difference for each parity area of the node. With respect to the parity part difference information, for each parity area, the information corresponding to the parity area is information indicating the presence of difference when there is the information indicating the presence of difference for the storage area of any of the data sets used for generating the parity stored in the parity area.

According to the present invention, the size of the difference information that is to be retained in the memory of each node for the difference rebuild can be reduced.

BRIEF DESCRIPTION OF THE DRAWINGS

FIG. 1 illustrates an example of an outline of difference rebuild according to a first embodiment;

FIG. 6 illustrates an example of a storage pool management table;

FIG. 7 illustrates an example of a parity group management table;

FIG. 8 illustrates an example of a difference information management table;

DESCRIPTION OF EMBODIMENTS

Figure 2:
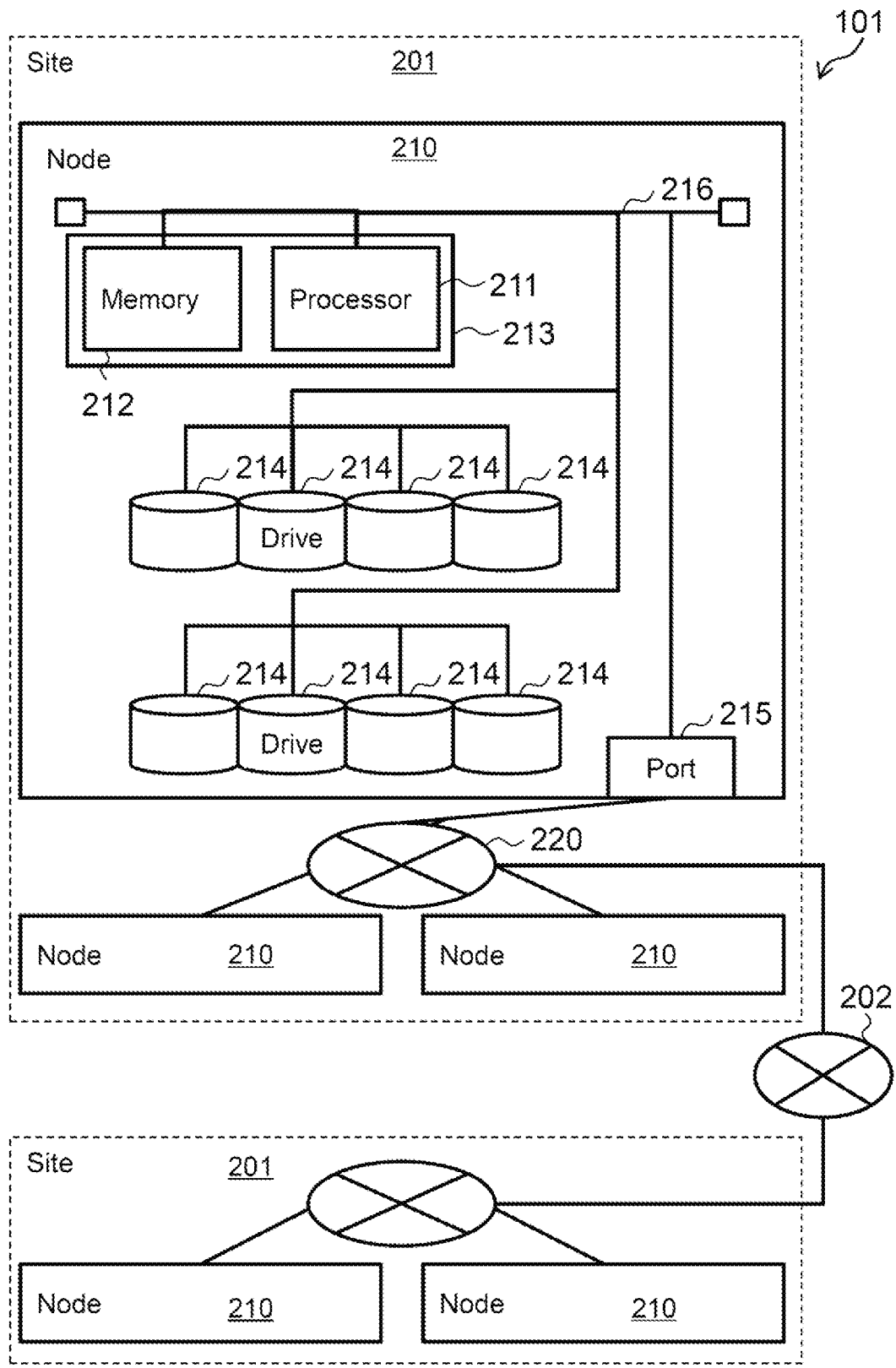
FIG. 2 illustrates an example of a physical configuration of a storage system.

In the following description, an "interface device" may be one or more communication interface devices. The one or more communication interface devices may be one or more the same types of communication interface devices (for example, one or more network interface cards (NICs)) or may be two or more different types of communication interface devices (for example, NICs and host bus adapters (HBAs)).

In addition, in the following description, a "memory" is one or more memory devices which are an example of one or more storage devices and may be typically a main storage device. At least one memory device in the memory may be a volatile memory device or may be a non-volatile memory device.

In addition, in the following description, the "permanent storage device" may be one or more permanent storage devices which are examples of one or more storage devices. The permanent storage device may typically be a non-volatile storage device (for example, an auxiliary storage device), and specifically, may be for example, a hard disk drive (HDD), a solid state drive (SSD), or a non-volatile memory express (NVMe) drive.

In addition, in the following description, a "processor" may be one or more processor devices. The at least one processor device may typically be a microprocessor device such as a central processing unit (CPU), but may be another type of a processor device such as a graphics processing unit (GPU). The at least one processor device may be a single-core or a multi-core. The at least one processor device may be a processor core. The at least one processor device may be a broad sense of the processor device such as a hardware circuit (for example, a field-programmable gate array (FPGA), a complex programmable logic device (CPLD) or an application specific integrated circuit (ASIC)) that performs a portion or all of processing.

In addition, in the following description, information in which output for input is obtained may be described by expressions such as "xxx table", but the information may be data of any structure (for example, the information may be structured data or unstructured data), and the information may be a neural network that generates the output for the input, a genetic algorithm, or a learning model represented by a random forest. Therefore, an "xxx table" can be referred to as "xxx information". In addition, in the following description, the configuration of each table is an example, and one table may be divided into two or more tables, or all or a portion of two or more tables may be one table.

In addition, in the following description, the process may be described with "program" as the subject, but since the program appropriately performs specified processing by being executed by the processor by using the storage device and/or the interface device and the like, the subject of the processing may be the processor (or the device such as a controller having the processor). The program may be installed from a program source on the device such as a computer. The program source may be, for example, the program distribution server or the computer-readable (for example, non-temporary) recording medium. In addition, in the following description, two or more programs may be realized as one program, or one program may be realized as two or more programs.

In addition, in the following description, the reference numeral may be used when the same type of element is not distinguished, and an element ID (for example, identification number) may be used when the same type of element is described in a distinguishment manner. For example, when nodes are described without distinguishment, the nodes may be described as a "node 210", and when individual nodes are described in the distinguishment manner, the nodes may be described as a "node 1" and a "node 2". In addition, by adding v to a name of an element of a node v (v is an integer of 0 or more), it is possible to distinguish to which node the element belongs (or to which node is the element corresponding).

In addition, in the following description, a "segment" is an example of a storage area based on a permanent storage device, and may be a portion of a node area. The data stored in the segment may be stored in the permanent storage device that is a basis of the segment. Specifically, the segment may store a user data set or a parity. The segment in which the user data set is stored can be referred to as a "user segment", and the segment in which the parity is stored can be referred to as a "parity segment". It is noted that the "user data set" may be configured with a user data group portion including at least a portion of data (write target data) accompanying a write request. The "user data group portion" is a portion of the user data group, and the "user data group" may be the set of all user data sets stored in a stripe. The "parity" may be the data set generated based on the user data group. The "data set" may be data stored in one segment and may be the general term for the user data set and the parity in the following description. The data set may be data in units of a segment. In addition, the "segment" may be configured with one or more blocks.

In addition, in the following description, the "node area" may be one logical storage area as the set of the plurality of segments provided by one node.

In addition, in the following description, the "stripe" may be a storage area group as the data protection unit to which a data protection policy is applied and may be, for example, the storage area group configured with each segment of n node areas. Specifically, for example, the stripe may be the storage area configured with n segments (for example, n segments having the same logical address). When a storage system is configured with N nodes (N is an integer of 2 or more), n may be the integer of 2 or more and N or less.

In addition, in the following description, a "redundant configuration area" may be the storage area configured with the N node areas.

First Embodiment

FIG. 1 illustrates an example of an outline of difference rebuild. It is noted that, in the description of FIG. 1, a segment belonging to a segment w among nodes v is expressed as a "segment vw".

Nodes 1 to 4 are examples of a plurality of the nodes (storage nodes) 210 constituting a storage system 101. Each data protection policy of stripes a to d is 2D2P, and each stripe is configured with four segments possessed by the nodes 1 to 4. The storage system 101 may be provided as a software defined storage (SDS) by executing predetermined software on each of the nodes 1 to 4.

In FIG. 1, "P" and "Q" represent respective parities. For example, focusing on the stripe a, a user data set A is stored in a user segment 1a, a user data set B is stored in a user segment 2a, a parity PAB generated by using the user data sets A and B is stored in a parity segment 3a, and a parity $Q_{AB}$ generated by using the user data sets A and B is stored in a parity segment 4a. In the embodiment, each of the nodes 1 to 4 has both the user segment and the parity segment, but the storage system may be configured with a node having the user segment but not having the parity segment and a node having the parity segment but not having the user segment.

Each of the nodes 1 to 4 can retain difference information 5. Specifically, for example, when failure occurs in any node 210, each of the remaining nodes 210 retains the difference information 5 for difference management. Out Of the difference information 5, the information including the information indicating whether or not to be in presence of difference for each user segment is the user part difference information, and the information including the information indicating whether or not to be in the presence of difference for each parity segment is the parity part difference information. In the embodiment, difference information 5-v including the information indicating whether or not to be in the presence of difference for each segment of the node v is retained in the memory of the node v, but the difference information 5-v about the node v may be retained in the memory of the node (for example, a node (v+1) or a node (v−1)) different from the node v. In addition, in the embodiment, in both the user part difference information and the parity part difference information, the information indicating whether or not to be in the presence of difference for each segment is the bit (hereinafter, difference bit). The difference bit "1" represents the presence of difference, and the difference bit "0" represents the absence of difference. In the embodiment, the user part difference information and the parity part difference information are also bitmaps configured with difference bits for each segment.

Among the nodes 1 to 4, the node 4 is assumed to be the failed node. In addition, it is assumed that while there is failure in the node 4 (while the node 4 is stopped), the node 1 responds to the write request (for example, the write request in which the volume or stripe for which the node 1 has an owner right is a write destination) from a host 350 and updates the old user data set A of the user segment 1a to a new user data set A'. In this case, the node 1 updates the difference bit corresponding to the user segment 1a out of the user part difference information of difference information 5-1 to "1". In addition, the node 1 generates an intermediate data set generated by using the new user data set A' and the old user data set A and transmits the intermediate data set to the surviving node 3 having the parity segment 3a in the stripe a. The node 3 receives the intermediate data set from the node 1, generates a new parity $P_{A'B}$ by using the intermediate data set and the old parity $P_{AB}$, and stores the new parity $P_{A'B}$ in the segment 3a. The node 3 updates the difference bit corresponding to the parity segment 3a out of the parity part difference information of difference information 5-3 to "1".

After that, it is assumed that the node 4 is recovered from the failure. In this case, the difference rebuild is performed on the recovered node 4.

First, the node 4 restores the parity part difference information out of difference information 5-4. Specifically, the node 4 sets the "OR" of the difference bit of all the user segments in the stripe including the parity segment as the difference bit corresponding to the parity segment for each parity segment of the node 4. For this reason, each of parity segments 4a and 4b is as follows.

The difference bit corresponding to the parity segment 4a is "1". This is because, among the user segments 1a and 2a in the stripe a including the parity segment 4a, the difference bit corresponding to the user segment 1a is "1".

The difference bit corresponding to the parity segment 4b is "0". This is because, among user segments 2b and 2cb in the stripe b including the parity segment 4b, the difference bit corresponding to any of the user segments is "0".

In this manner, according to the embodiment, the difference bit of the parity segment is the "OR" of the difference bit of all the user segments in the stripe including the parity segment. For this reason, a replica of the difference bit (redundant difference bit) for each user segment in the stripe including the parity segment is not necessarily retained in the memory of the node having the parity segment. For this reason, the memory usage is reduced. In addition, according to the embodiment, with respect to the stripe based on the n nodes 210 to which the redundancy k is applied, when any node 210 becomes the failed node, the number of nodes 210 is n' (=n−1), but the difference bit related to the user segment of the stripe may be retained by the (n'−1) nodes 210. According to the example illustrated in FIG. 1, the difference bit for the user segment 1a may be present in the two nodes 1 and 3 among the three nodes 1 to 3 (n'=3) (in the node 3, the difference bit for the user segment 1a is "OR" of the difference bits of the user segments 1a and 1b). For this reason, the memory usage of the entire storage system is reduced.

After the parity part difference information of the difference information 5-4 is restored, the node 4 restores the parity only for the parity segment of which difference bit is "1" among the plurality of parity segments possessed by the node 4 (in other words, restoration is skipped for the parity segments with the difference bit of "0"). For example, the node 4 reads the user data sets A' and B from the user segments 1a and 2a, generates a parity $Q_{A'B}$ by using the user data sets A' and B, and stores the parity $Q_{A'B}$ in the segment 4a.

It is noted that, with respect to each user segment of the recovered node 4, when the difference bit corresponding to any of the parity segments of the segment including the user segment is "1", although the user data set of the user segment is not actually updated, the difference bit corresponding to the user segment is set to "1". This is because the parity segment being updated is that there is the possibility that all user segments in the same stripe are updated. For example, it is assumed that the difference bit is set to "1" for each of parity segments 1c and 2c because the user data set E of the user segment 3c is updated while the node 4 is in failure. When the node 4 is recovered, since the difference bits of the parity segments 1c and 2c are "1", the node 4 sets the difference bits corresponding to the user segment 2c out of the user part difference information of the difference information 5-4 to "1" and restores (reads) the user data set F from the user segment 2c corresponding to the difference bit "1".

In addition, the restoration destination of the data set (user data set or parity) restored in the recovered node 4 is not limited to the segment (an example of the storage area) in which the data set before restoration is stored, but may be another segment in the recovered node 4 (or a different node).

FIG. 2 illustrates an example of a physical configuration of the storage system 101.

The storage system 101 may be provided with one or more sites 201. Respective sites 201 are communicably connected to each other via a network 202. The network 202 is, for example, the wide area network (WAN), but not limited to the WAN.

The site 201 is the data center or the like and is configured to include one or more nodes 210.

The node 210 may have the general server computer configuration. The node 210 is configured to include, for example, one or more processor packages 213, one or more drives 214, and one or more ports 215. Respective components are connected to each other via an internal bus 216. The processor package 213 includes a processor 211, a memory 212, and the like. The one or more drives 214 are examples of permanent storage devices. The one or more ports 215 are examples of interface devices.

The processor 211 is, for example, a CPU and performs various types of processing.

The memory 212 stores information for control required for realizing the function of the node 210 or stores data. In addition, the memory 212 stores, for example, the program executed by the processor 211. The memory 212 may be the volatile dynamic random access memory (DRAM), may be the non-volatile SCM, or may be another storage device.

The drive 214 stores various data, programs, and the like. The drive 214 may be the SCM or the like besides the HDD or SSD connected to serial attached SCSI (SAS) or serial advanced technology attachment (SATA), the SSD connected to NVMe and is an example of the storage device.

The port 215 is connected to a network 220 and communicably connected to other nodes 210 within the site 201. The network 220 is, for example, the local area network (LAN), but not limited to the LAN.

The physical configuration of the storage system 101 is not limited to the above contents. For example, the networks 202 and 220 may be redundant. In addition, for example, the network 220 may be separated into the network for management and the network for storage, the connection standard may be Ethernet (registered trademark), Infiniband, or wireless, and the connection topology is not limited to a configuration as illustrated in FIG. 2.

Figure 3:
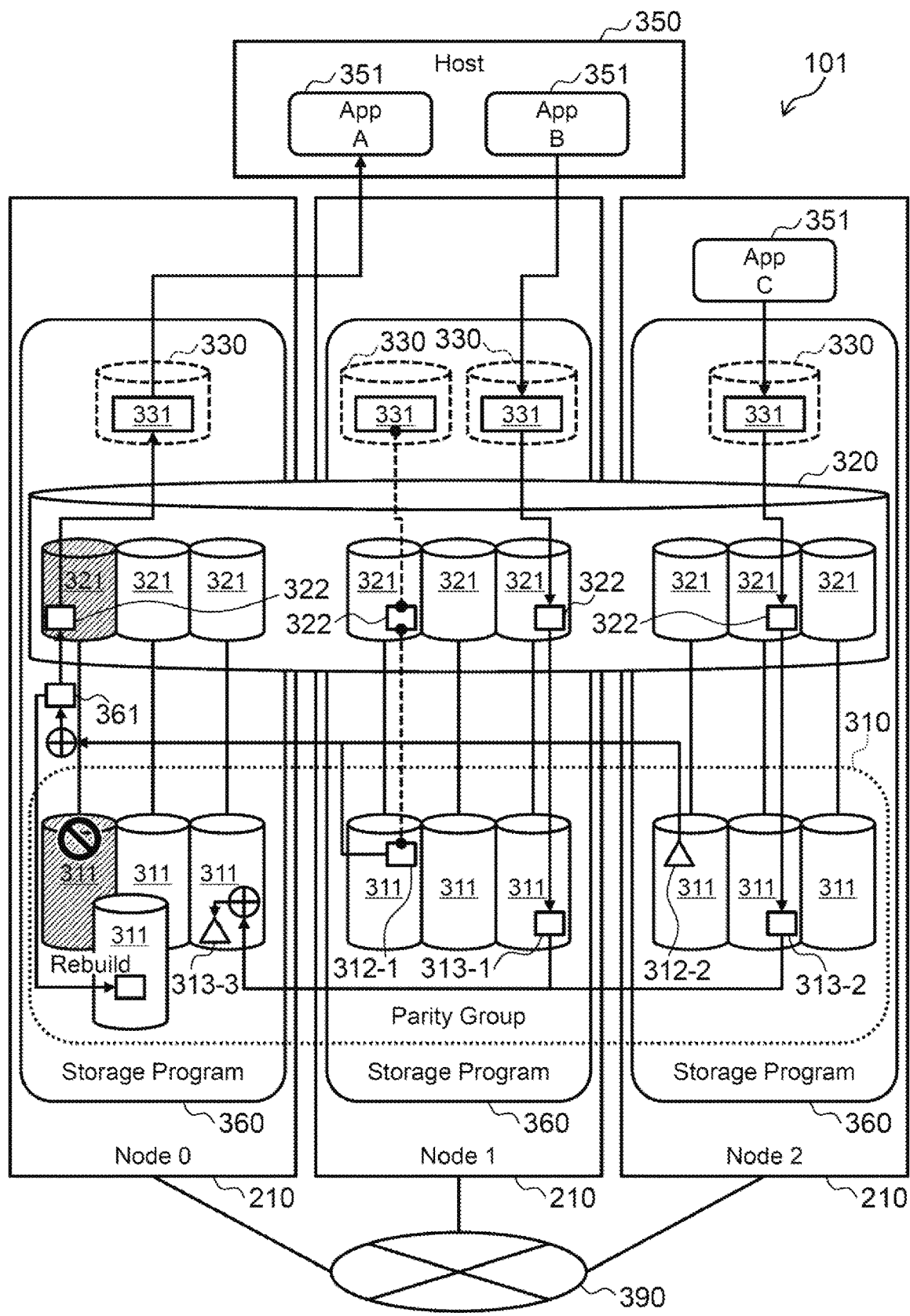
FIG. 3 illustrates an example of a logical configuration of the storage system.

FIG. 3 illustrates an example of the logical configuration of the storage system 101.

The node 210 includes a storage program 360. The storage program 360 constitutes a parity group 310.

The parity group 310 is an example of the redundant configuration area. The parity group 310 is configured with physical chunks 311 based on the drives 214 of the plurality of nodes 210. The parity group 310 is the group that protects data across the nodes 210, and for example, when the data protection policy is 2D1P, the parity group 310 is configured with the three physical chunks 311 secured from the drives 214 of the different nodes 210. The data protection policies include duplication, erasure coding (EC), multi-stage erasure coding (MEC), and the like.

The physical chunk 311 is the area of all or a portion of a physical area included in the drive 214 and is the continuous area. The physical chunk 311 is configured to include the physical area (data area) for storing the user data set and the physical area (parity area) for storing the parity. The parity is the redundant code for restoring the user data set from the failure. The data area may be configured with one or more user segments. The parity area may be configured with one or more parity segments. In the parity group 310, for each node 210, one or more physical chunks provided by the node 210 is an example of the node area.

According to the example illustrated in FIG. 3, user data sets 313-1 and 313-2 and a parity 313-3 are stored in one stripe. The user data set 313-1 includes data stored by an application 351 (App B) of the host 350. The user data set 313-2 includes data stored by the application 351 (App C) of the host 350.

In addition, according to the example illustrated in FIG. 3, when the application 351 (App A) of the host 350 requests the reading of the user data of the node 0 in which the failure occurs, a user data set 361 is restored from a user data set 312-1 and a parity 312-2 in the stripe with the user data, and the user data based on the restored user data set 361 is responded to the application 351. The restored user data set 361 is stored in the physical chunk 311 of the node 0 as the rebuilt data. Accordingly, the overhead of the second and subsequent readings of the data of the node 0 in which the failure occurs is reduced, and it is expected that the throughput and the response are improved.

A logical chunk 321 is cut out from the parity group 310. The logical chunk 321 is a unit for allocating the capacity to a storage pool 320 of each node 210 and is the area corresponding to the data area among one or more physical chunks. The one logical chunk 321 may be cut out from one parity group 310, or the plurality of the logical chunks 321 may be cut out.

In addition, the storage program 360 constitutes the storage pool 320. The storage pool 320 is configured to include the plurality of logical chunks 321 and virtualizes the capacity of the entire storage system 101. The storage program 360 provides a virtual volume 330 used by the application 351 to the host 350. The virtual volume 330 is an example of the volume (particularly the online volume provided to the higher level system such as a host 350). The virtual volume 330 is associated with the storage pool 320. In this manner, the storage program 360 does not allocate the capacity according to a user request to the drive 214, but allocates the capacity as the virtual volume 330. The two or more virtual volumes 330 in the two or more nodes 210 may be provided to the same host 350 (the same application 351).

For example, when the storage program 360 receives the write request from the application 351, if a page 332 is not allocated to a page 331 including the area designated with the write request, the storage program 360 allocates a page 322 from the storage pool 320. The page 322 is a unit area of the storage pool 320. The page 322 is dynamically allocated to the virtual volume 330. That is, in the embodiment, thin provisioning is adopted. The page 322 corresponds to the area in the physical chunk 311. The data input/output to/from the page 322 is input/output to/from the physical chunk 311. It is noted that the data (or intermediate data described later) of the write request is transmitted to another node 210 related to data redundancing, and the parity is updated.

In this manner, the storage program 360 manages the drive 214 as the shared storage pool 320 and allocates the capacity from the drive 214 according to the data amount written to the virtual volume 330. Accordingly, the unused drive 214 is not wasted, and efficient operations are performed.

The application 351 accessing the data may be provided and operated on the host 350, may be provided and operated on the same node 210 as the storage program 360, or may be provided and operated in another node 210. In addition, according to the example illustrated in FIG. 3, the rebuild destination is inside the node 210 in which the failure occurs, but instead, may be outside the node 210 in which the failure occurs (for example, the surviving node).

Figure 4:
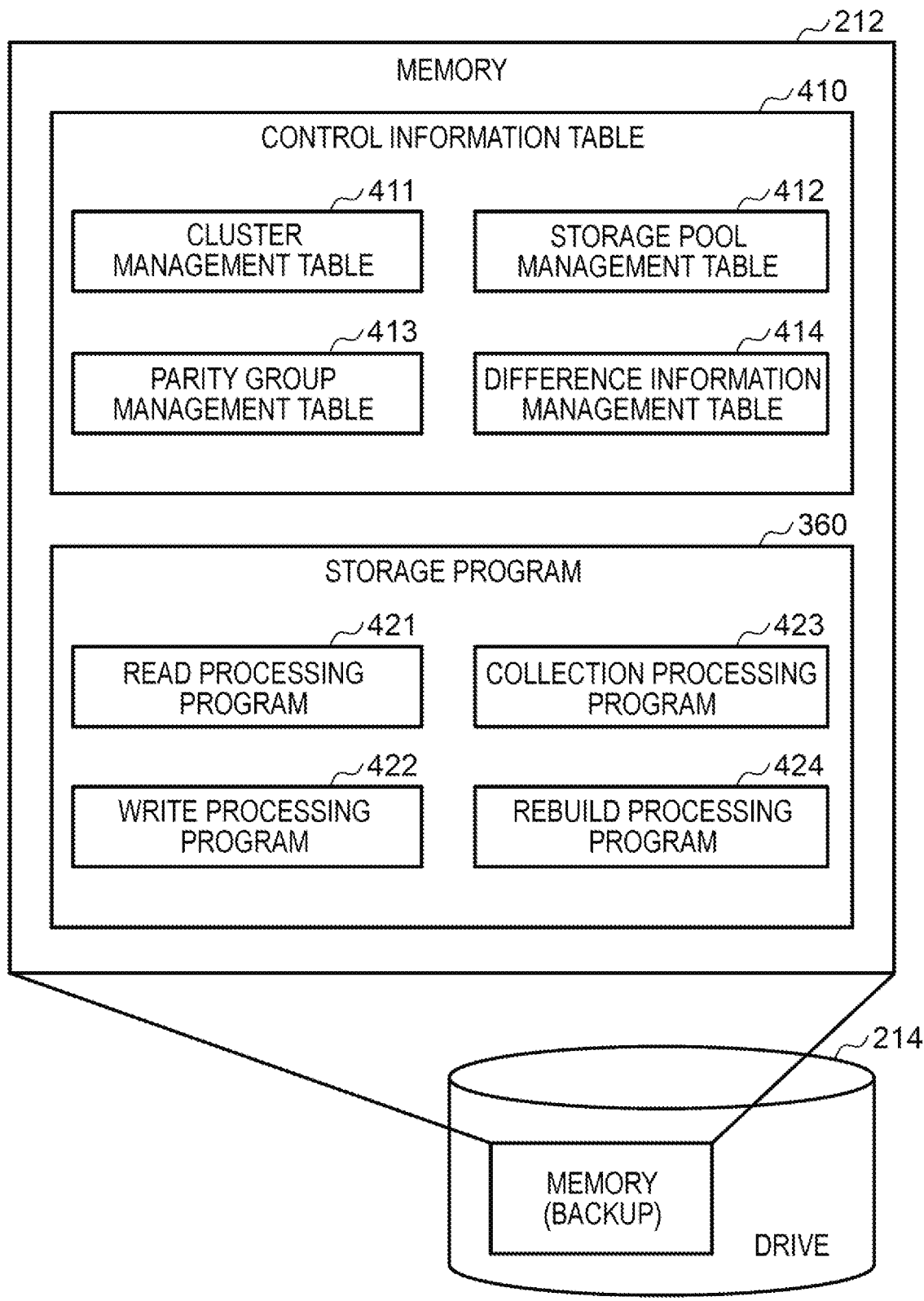
FIG. 4 illustrates an example of information in a memory.

FIG. 4 illustrates an example of the information in the memory 212 (information read from the drive 214 to the memory 212). It is noted that a control information table 410 and various programs (the storage program 360 and the like) are loaded on the memory 212 during the execution, but are stored in the non-volatile area such as the drive 214 in case of the power failure or the like.

The control information table 410 includes a cluster management table 411, a storage pool management table 412, a parity group management table 413, and a difference information management table 414. Each table will be described later.

The storage program 360 includes a read processing program 421, a write processing program 422, a collection processing program 423, and a rebuild processing program 424. The functions (the read processing program 421, the write processing program 422, the collection processing program 423, the rebuild processing program 424, and the like) of the node 210 may be realized, for example, by (software) the processor 211 reading the program stored in the drive 214 into the memory 212 and executing the program, may be realized by hardware such as a dedicated circuit, or may be realized by combining software and hardware. In addition, some of the functions of the node 210 may be realized by another computer capable of communicating with the node 210.

Figure 5:
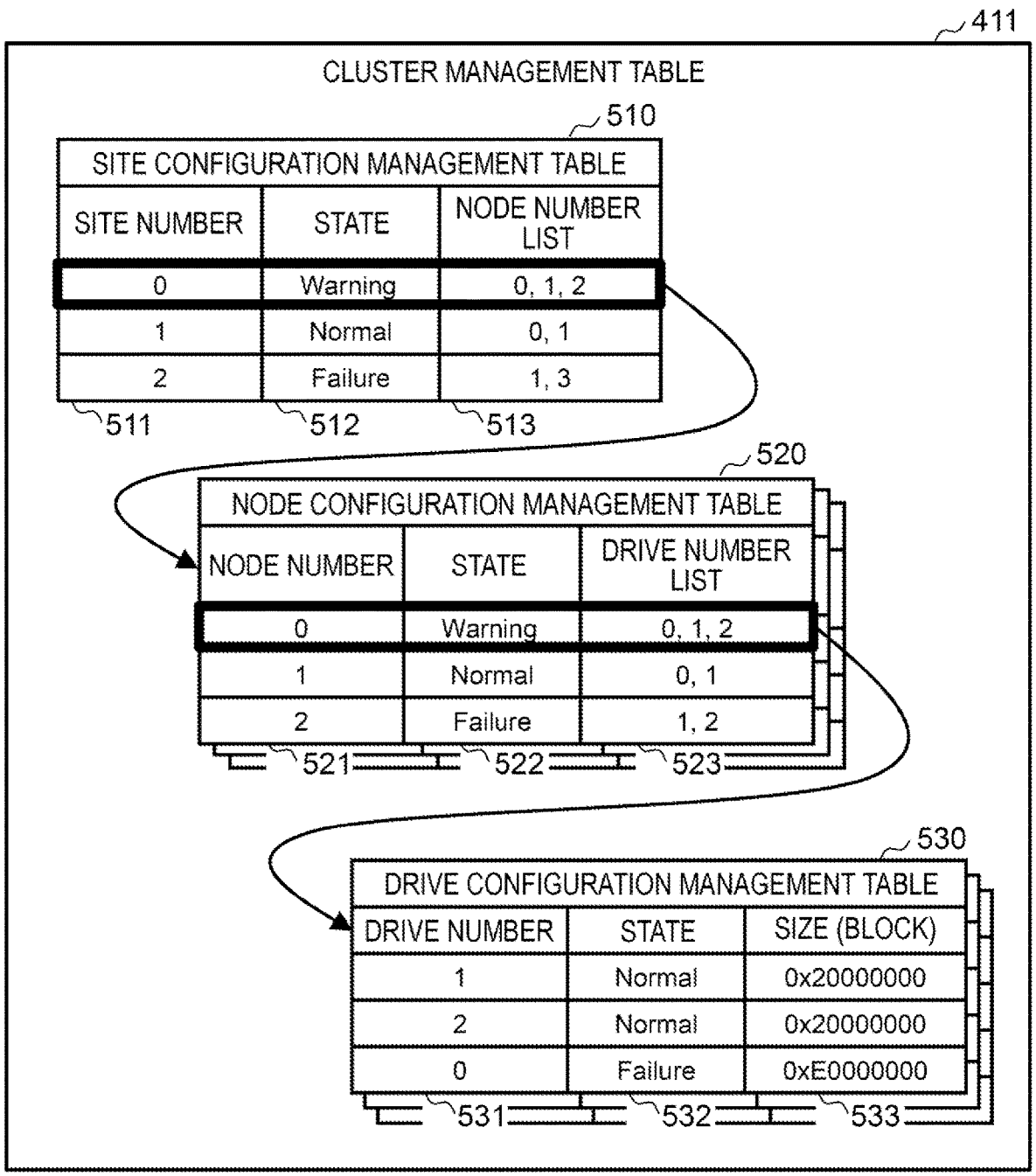
FIG. 5 illustrates an example of a cluster management table.

FIG. 5 illustrates an example of the cluster management table 411.

The cluster management table 411 stores information for managing the configurations of the site 201, the node 210, and the drive 214.

The cluster management table 411 is configured to include a site configuration management table 510, a node configuration management table 520, and a drive configuration management table 530. It is noted that the storage system 101 manages the site configuration management table 510, the site 201 manages the plurality of the node configuration management tables 520 in the site 201, and the node 210 manages the plurality of the drive configuration management tables 530 in the node 210.

The site configuration management table 510 stores information indicating the configuration (relationship between the site 201 and the node 210 and the like) related to the site 201. More specifically, the site configuration management table 510 stores information in which the site number 511, the state 512, and the node number list 513 are associated.

The site number 511 is identification information that can identify the site 201. The state 512 is state information (Normal, Warning, Failure, or the like) indicating the state of the site 201. The node number list 513 is identification information that can identify the node 210 provided at the site 201.

The node configuration management table 520 is provided for each site 201 and stores information indicating the configuration (relationship between the node 210 and the drive 214 and the like) related to the node 210 provided at the site 201. More specifically, the node configuration management table 520 stores information in which a node number 521, a state 522, and a drive number list 523 are associated.

The node number 521 is identification information that can identify the node 210. The state 522 is state information (Normal, Warning, Failure, or the like) indicating the state of the node 210. The drive number list 523 is identification information that can identify the drive 214 provided in the node 210.

The drive configuration management table 530 is provided for each node 210 and stores information indicating the configuration related to the drive 214 provided in the node 210. More specifically, the drive configuration management table 530 stores information associated with a drive number 531, a state 532, and a size 533 (block).

The drive number 531 is identification information that can identify the drive 214. The state 532 is state information (Normal, Warning, Failure, or the like) indicating the state of the drive 214. The size 533 is information (for example, the number of blocks) indicating the capacity of the drive 214. For example, the block has the fixed size (512 bytes, or the like).

FIG. 6 illustrates an example of the storage pool management table 412.

The storage pool management table 412 stores control information for the thin provisioning function provided by the storage pool 320.

The storage pool management table 412 is configured to include a storage pool information table 610 and a virtual volume management table 620 and a page mapping table 630.

The storage pool information table 610 stores information related to the storage pool 320. More specifically, the storage pool information table 610 stores information in which a storage pool number 611, a total capacity 612 (block), and a consumption capacity 613 (block) are associated.

The storage pool number 611 is identification information that can identify the storage pool 320. The total capacity 612 is information (for example, the number of blocks) indicating the total capacity of the storage pool 320. The consumption capacity 613 is information (for example, the number of blocks) indicating the capacity consumed in the storage pool 320.

The virtual volume management table 620 stores information related to the virtual volume 330 (information indicating the correspondence relationship between the virtual volume 330 and the storage pool 320 to which the virtual volume 330 is allocated or the like). More specifically, the virtual volume management table 620 stores information in which a virtual volume number 621, a size 622 (block), and a storage pool number 623 are associated.

The virtual volume number 621 is identification information that can identify the virtual volume 330. The size 622 (block) is information (for example, the number of blocks) indicating the capacity of the virtual volume 330. The storage pool number 623 is identification information that can identify the storage pool 320 to which the virtual volume 330 belongs.

The page mapping table 630 stores information (information indicating the correspondence relationship between the page 331 and the logical chunk 321 and the like) related to the page 331 allocated to the virtual volume 330. More specifically, the page mapping table 630 stores information in which a page number 631, a virtual volume number 632, a logical block address (LBA) 633, a size 634 (block), a logical chunk number 635, and an LBA 636 are associated.

The page number 631 is identification information that can identify the page 331. The virtual volume number 632 is identification information that can identify the virtual volume 330 to which the page 331 is allocated. The LBA 633 is information that can specify the position of the page 331 in the virtual volume 330 and is, for example, information indicating the number from the first page 331 of the virtual volume 330. Note that page 331 is a unit for the storage program 360 to access the virtual volume 330. It is noted that the size 634 (block) is information (number of blocks) indicating the capacity of the page 331. The logical chunk number 635 is identification information that can identify the logical chunk 321 corresponding to the page 331. The LBA 636 is information that can specify the position of the logical chunk 321 in the storage pool 320 and is, for example, information indicating the number from the first logical chunk 321 of the storage pool 320.

It is noted that the size 634 may be the same for all pages 331 or may be different for each page 331.

In addition, the storage program 360 refers to the page mapping table 630 when conversion from the address of the virtual volume 330 to the address of the storage pool 320 is performed. In addition, the storage program 360 performs allocation of the page 331 (addition of the record to the page mapping table 630) every time the new write is received.

FIG. 7 illustrates an example of the parity group management table 413.

The parity group management table 413 stores control information for managing the configuration of the parity group 310 (redundancing group) configured by combining the physical chunk 311 and the plurality of physical chunks 311.

The parity group management table 413 is configured to include a logical chunk management table 710, a parity group management table 720, and a physical chunk management table 730.

The logical chunk management table 710 stores information (logical chunk information) related to the logical chunk 321 cut out from the parity group 310. More specifically, the logical chunk management table 710 stores information in which a logical chunk number 711, a size 712 (block), and a parity group number 713 are associated.

The logical chunk number 711 is identification information that can identify the logical chunk 321 cut out from the parity group 310. The size 712 is information (for example, the number of blocks) indicating the capacity of the logical chunk 321. The parity group number 713 is identification information that can identify the parity group 310 to which the logical chunk 321 belongs.

The parity group management table 720 stores information (parity group information) related to the parity group 310. More specifically, the parity group management table 720 stores information in which a parity group number 721, a data protection setting 722, and a physical chunk number 723 are associated.

The parity group number 721 is identification information that can identify the parity group 310. The data protection setting 722 is the data protection setting of the parity group 310. The physical chunk number 723 is identification information that can identify the physical chunk 311 allocated to the parity group 310.

The physical chunk management table 730 stores information (information for cutting out the physical area of the drive 214 by the size from the start offset and managing the physical area as the physical chunk 311) related to the physical chunk 311. More specifically, the physical chunk management table 730 stores information in which a physical chunk number 731, a start offset 732, a size 733 (block), and a site number/node number/drive number 734 are associated.

The physical chunk number 731 is identification information that can identify the physical chunk 311. The start offset 732 is information indicating the start position when the physical chunk 311 is cut out from the drive 214. The size 733 (block) is information (number of blocks) indicating the capacity of the physical chunk 311. The site number/node number/drive number 734 is identification information (information indicating from which drive 214 of which node 210 of which site 201 the physical chunk 311 is cut out) that can identify the storage resource from which the physical chunk 311 is cut out.

FIG. 8 illustrates an example of the difference information management table 414.

The difference information management table 414 is the table for managing the difference information. The difference information management table 414 stores information in which a physical chunk number 801, user part difference information 802 and parity part difference information 803 are associated.

The physical chunk number 801 is identification information that can identify the physical chunk 311. The user part difference information 802 is information indicating whether or not the segment is a difference segment for each segment in the physical chunk 311. The parity part difference information 803 is information indicating whether or not the parity segment is the difference segment for each parity segment in the physical chunk 311.

In the embodiment, the difference information may be recorded to be linked to the area of the logical chunk 321 or the virtual volume in which the difference information is recorded in units of physical chunks 311. In the difference information, the difference bit is included for each area of a unit size (for example, 32 KB). In the embodiment, the area of the unit size is the segment. For each segment, the difference bit indicates whether the segment is in the presence of difference ("1") or not ("0"), that is, whether or not the segment is the difference segment.

For each physical chunk 311 of the node 210, the difference bit for each segment in the user part difference information 802 and the difference bit for each parity segment in the parity part difference information 803 are as follows.

The difference bit in the user part difference information 802 indicates whether or not the segment is updated by the node 210. The segment may be the user segment or the parity segment.

The difference bit in the parity part difference information 803 is information as the "OR" operation result of the difference bit (difference bit of the user part difference information 802) from two or more different nodes 210. Specifically, in the parity part difference information 803, the difference bit is a result of the "OR" operation of the difference bits from the two or more different nodes having the two or more user segments out of the stripe including the parity segment corresponding to the difference bit.

Hereinafter, the example of the processing performed in the embodiment will be described. It is noted that, in the following description, the input/output (I/O) request is the write request or the read request. The I/O request is issued from the host 350 (or another type of input/output (I/O) request source). In the I/O request, the I/O destination (for example, the virtual volume number such as a logical unit number (LUN), the address such as LBA, or the like) is designated. There may be an owner right management table representing the node having the owner right of the virtual volume 330 (or the area in the virtual volume 330) in units of the virtual volume 330 (or in units of the area in the virtual volume 330). The owner right management table may be retained by each node 210. When the node having the owner right of the area designated with the I/O request is the node 210 that receives the I/O request, the node 210 may process the I/O request. On the other hand, when the node having the owner right of the area designated with the I/O request is not the node 210 that receives the I/O request, the node 210 may transmit the I/O request to the node 210 having the owner right of the area based on the owner right management table. The owner right may be provided for each of the areas having different sizes of the stripes or the like instead of or in addition to the virtual volume 330. The owner right may be paraphrased as the access right.

Figure 9:
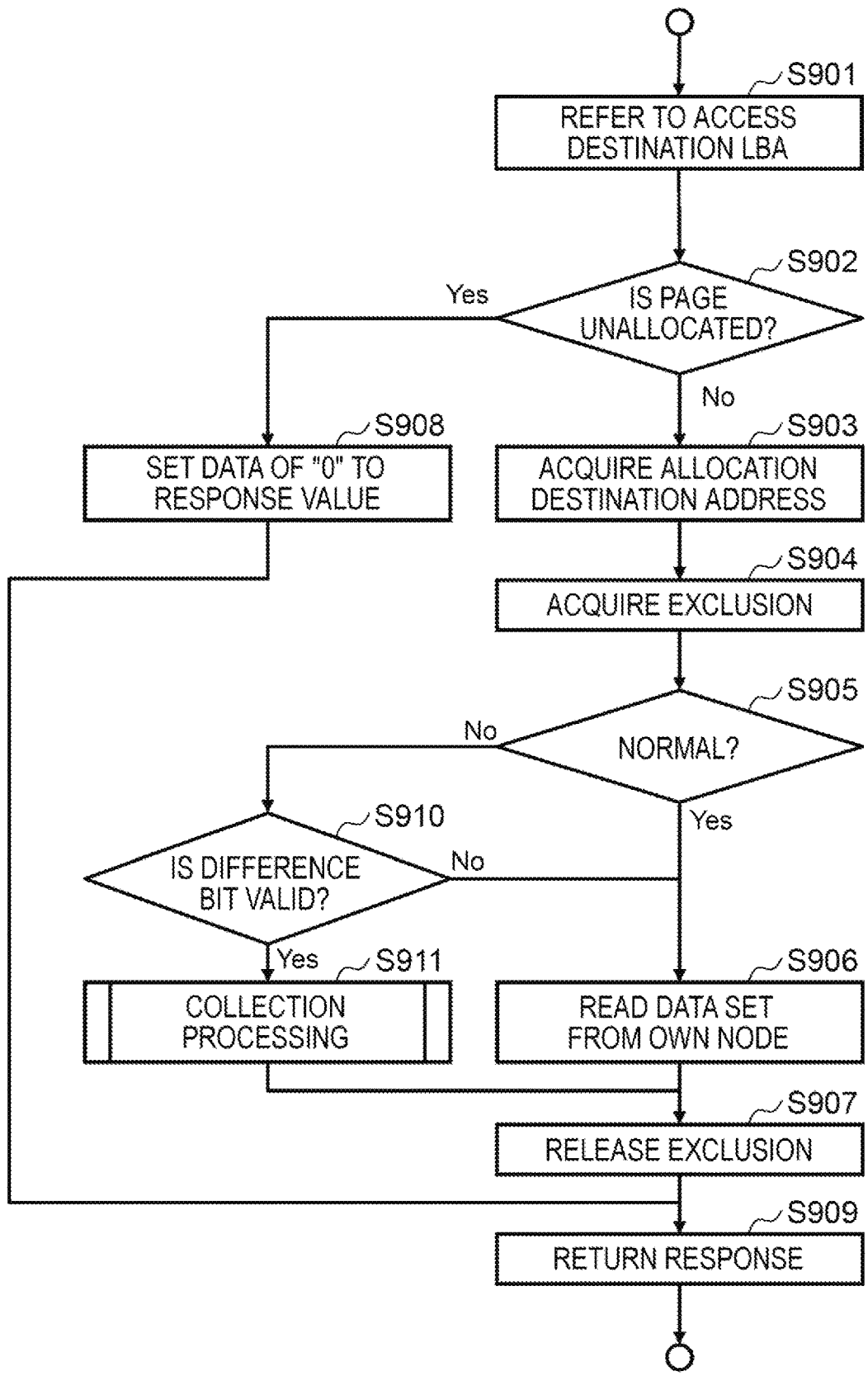
FIG. 9 illustrates a flow of read processing performed by a read processing program.

FIG. 9 illustrates a flow of the read processing performed by the read processing program 421.

The read processing program 421 refers to an access destination LBA designated with the received read request (S901) and determines based on the storage pool management table 412 whether or not the page 322 is unallocated to the area to which the access destination LBA belongs (the area in the virtual volume 330) (S902). When the determination result of S902 is true (Yes in S902), the read processing program 421 generates response data (for example, data in which the values of all bits are "0") indicating that the page 322 is unallocated (S908) and returns the response data to a transmission source (for example, the host 350) of the read request (S909).

When the determination result of S902 is false (No in S902), the read processing program 421 acquires an allocation destination address (address corresponding to the access destination LBA) in the page 322 allocated to the area to which the access destination LBA belongs from the storage pool management table 412 (S903). The read processing program 421 acquires the exclusion of the acquired allocation destination address (S904).

The read processing program 421 determines based on the storage pool management table 412 and the cluster management table 411 whether or not the acquired allocation destination address is in the normal state ("Normal") (S905). When the determination result of S905 is true (Yes in S905), the read processing program 421 reads the data of the read target from the drive 214 of the own node (the node having the read processing program 421) (S906), releases the exclusion acquired in S904 (S907), and returns the response data including the data of the read target to the transmission source (for example, the host 350) of the read request (S909). In S906, data is read from the area in the physical chunk 311 of the own node, which is the area corresponding to the access destination LBA.

When the determination result of S905 is false (No in S905), based on the difference information management table 414, the read processing program 421 determines whether or not the difference bit (the difference bit in the user part difference information 802) of the physical area (the area in the physical chunk 311) corresponding to the access destination LBA is valid ("1"), that is, whether or not the physical area is the difference segment (S910). When the determination result of S910 is false (No in S910), that is, when the allocation destination address is not in the normal state but the physical area corresponding to the access destination LBA is not the difference segment, the drive 214 that is a basis of the physical area corresponding to the access destination LBA is in the state of being rebuilt, but the data in the physical area corresponding to the access destination LBA is rebuild-completed. For this reason, S906 is performed.

When the determination result of S910 is true (Yes in S910), the read processing program 421 issues execution instruction of collection processing (S911) to the collection processing program 423 and, after that, the collection processing is executed S907 and S909. In the execution instruction, the physical area (that is, which physical area the collection processing is performed on) corresponding to the access destination LBA may be designated.

Figure 10:
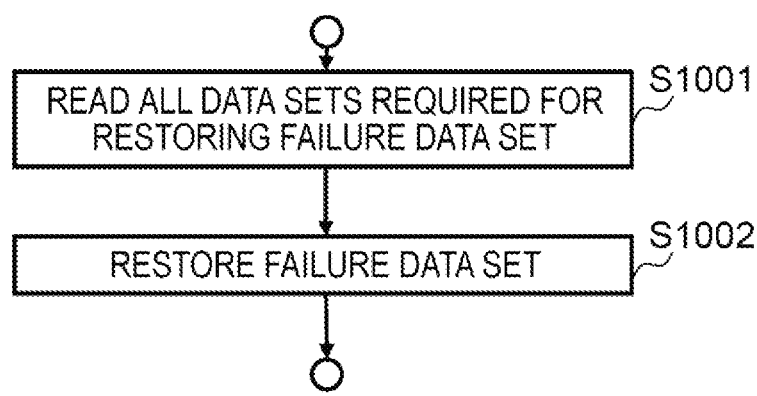
FIG. 10 illustrates a flow of collection processing performed by a collection processing program.

FIG. 10 illustrates a flow of the collection processing performed by the collection processing program 423. The collection processing is performed in response to the execution instruction of the collection processing. It is assumed that, in the execution instruction, the physical area (that is, which physical area the collection processing is performed on) is designated.

The collection processing program 423 specifies the parity group 310 having the physical chunk 311 including a target physical area (the physical area of a collection processing target) based on the parity group management table 413. The collection processing program 423 reads all the data sets required for restoring a failure data set (the data set (the user data set or the parity) in the difference segment) for each difference segment in the target physical area, from the physical chunk 311 (that is, one or more different nodes 210) other than the physical chunk 311 including the target physical area out of the specified parity group 310 based on the difference information management table 414 (S1001). When the I/O range size (an example of the unit size of the input/output) matches with the segment (an example of the unit area corresponding to the difference bit), the collection processing program 423 restores the failure data set to the difference segment by using the read data set for each difference segment in the target physical area and clears the difference bit corresponding to the difference segment (S1002). Clearing of the difference bit is updating of the difference bit from "1" to "0".

Figure 11:
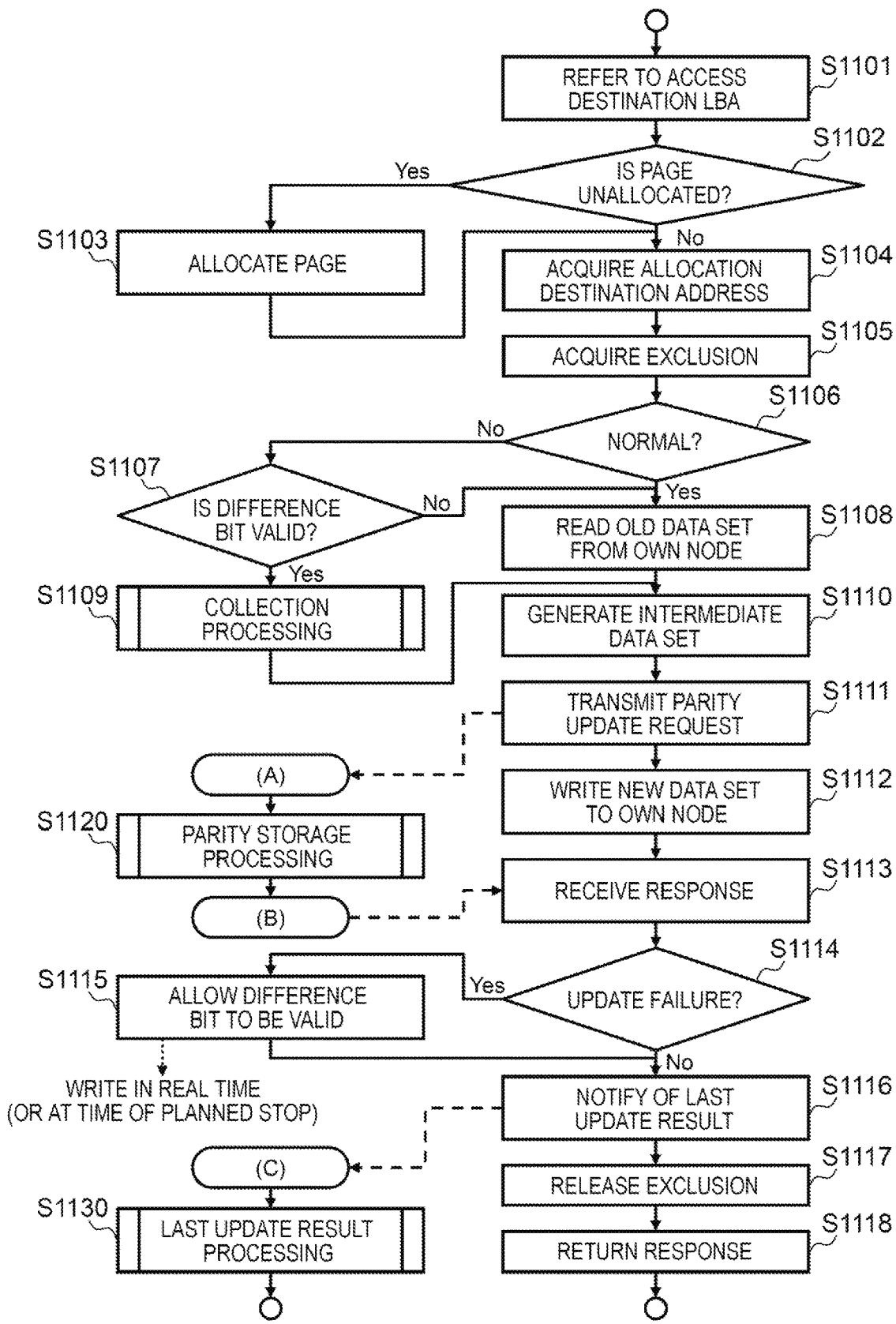
FIG. 11 illustrates a flow of write processing performed by a write processing program.

FIG. 11 illustrates a flow of the write processing performed by the write processing program 422.

The write processing program 422 refers to the access destination LBA designated with the received write request (S1101) and determines based on the storage pool management table 412 whether or not the page 322 is unallocated to the area (the area in the virtual volume 330) to which the access destination LBA belongs (S1102). When the determination result of S1102 is true (Yes in S1102), the write processing program 422 specifies an empty page 322 (the page 322 in the allocatable state that is not allocated to any of the virtual volumes 330) from the storage pool management table 412 and allocates the specified page 322 to the area to which the access destination LBA belongs (the area in the virtual volume 330) (S1103).

When the determination result of S1102 is false (No in S1102), or after S1103, the write processing program 422 acquires the allocation destination address (the address corresponding to the access destination LBA) in the page 322 allocated to the area to which the access destination LBA belongs from the storage pool management table 412 (S1104). The write processing program 422 acquires the exclusion of the acquired allocation destination address (S1105).

The write processing program 422 determines whether or not the acquired allocation destination address is in the normal state ("Normal") based on the storage pool management table 412 and the cluster management table 411

(S1106). When the determination result of S1106 is true (Yes in S1106), the write processing program 422 reads the old user data set (user data set before the update) from the drive 214 of the own node (node having the write processing program 422) (S1108), and generates the intermediate user data set by using the read old user data set (S1110). The "intermediate user data set" is the temporary user data set generated when the user data set is partially updated and is the user data set illustrating the difference between old and new user data sets. For example, when the old user data sets A1 and A2 and the old parity AP are stored in the stripe, the intermediate user data set is generated as follows.

AP (old parity)=A1 (old user data set) XOR A2 (old user data set)

A1 (new user data set) XOR A1 (old user data set)=M (intermediate data set)

It is noted that the new parity is obtained as follows.

AP (old parity) XOR M (intermediate data set)=AP (new parity)

When the determination result of S1106 is false (No in S1106), based on the difference information management table 414, the write processing program 422 determines whether or not the difference bit (the difference bit in the user part difference information 802) of the physical area (the area in the physical chunk 311) corresponding to the access destination LBA is valid ("1"), that is, whether or not the physical area is the difference segment (S1107). When the determination result of S1107 is false (No in S1107), that is, when the allocation destination address is not in the normal state but the physical area corresponding to the access destination LBA is not the difference segment, the drive 214 that is a basis of the physical area corresponding to the access destination LBA is in the state of being rebuilt, but the data in the physical area corresponding to the access destination LBA is rebuild-completed. For this reason, S1108 is performed.

When the determination result of S1107 is true (Yes in S1107), the write processing program 422 issues the execution instruction of the collection processing (S1109) to the collection processing program 423, and after that, executes S1110. In the execution instruction, the physical area corresponding to the access destination LBA (that is, which physical area the collection processing is performed on) may be designated. The details of the collection processing are as described with reference to FIG. 10.

After S1110, the write processing program 422 transmits a parity update request in the parity segment to the parity storage node 210 (the node 210 having the parity segment) for the stripe including the segment in the physical area corresponding to the access destination LBA (S1111). The write processing program 422 writes the new data set to the physical chunk 311 (drive 214) of the own node (S1112).

In S1111, when the stripe has the plurality of parity segments, an update request is transmitted to each of the plurality of parity storage nodes. In the update request, the address of the parity segment may be designated. In addition, the update request includes the data set (for example, the intermediate data set corresponding to the stripe including the parity segment) required for parity update and at least a portion (for example, the difference bit corresponding to the user segment of the own node among the stripes including the parity segment) of the user part difference information 802 corresponding to the physical chunk 311 including the user segment of the own node among the stripes including the parity segment.

In response to the update request transmitted in S1111, parity storage processing (S1120) is performed by the parity storage node 210. The write processing program 422 receives a response to the update request transmitted in S1111 from the parity storage node 210 (S1113). The write processing program 422 determines whether or not the response represents the update failure (S1114).

When the determination result of S1114 is true (Yes in S1114), the write processing program 422 sets the difference bit of the physical area (the area in the physical chunk 311) corresponding to the access destination LBA to be valid ("1") (S1115). Accordingly, the difference information management table 414 is updated. The write processing program 422 may write the difference information management table 414 from the memory to the drive 214 immediately (or at the time of a planned stop of the storage system or the own node (for example, at the time of a stop by the user operation)). Accordingly, even though the difference information management table 414 is lost from the memory due to the power failure or the like, the difference information management table 414 can be restored.

When the determination result of S1114 is false (No in S1114), or after S1115, the write processing program 422 notifies the parity storage node 210 (the node 210 having the parity segment) for the stripe including the segment in the physical area corresponding to the access destination LBA of the last update result (S1116). The notification of the last update result includes the notification indicating whether or not all the data sets succeed in update for the stripe. When the update fails for any of the data sets, the notification of the last update result indicates the failure. In response to the notification transmitted in S1116, last update result processing (S1130) is performed by the parity storage node 210.

After S1116, the write processing program 422 releases the exclusion acquired in S1105 (S1117) and returns the response to the write request to the transmission source (for example, the host 350) of the write request (S1118).

Figure 12:
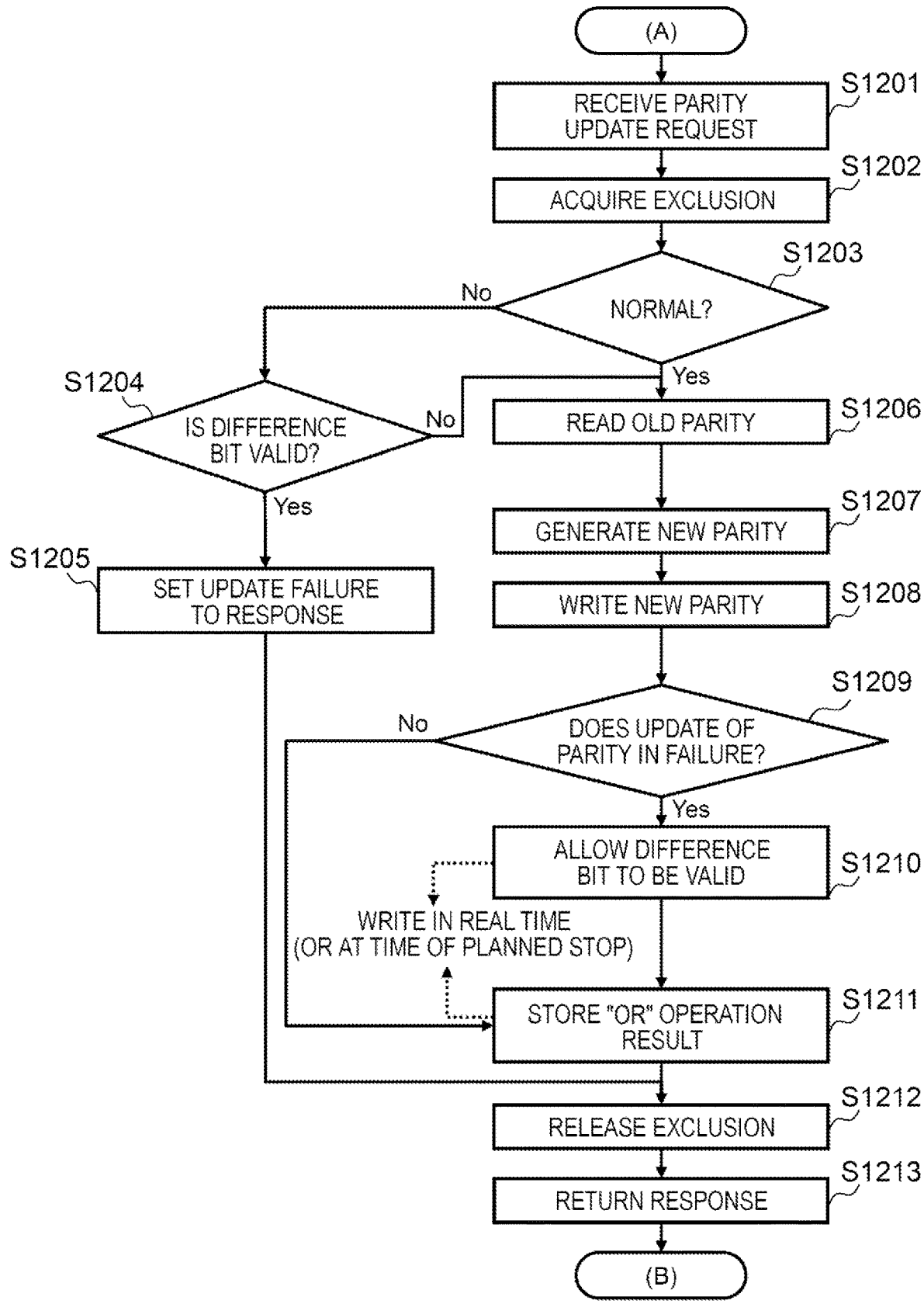
FIG. 12 illustrates a flow of parity storage processing performed by the write processing program in a parity storage node.

FIG. 12 illustrates a flow of the parity storage processing performed by the write processing program 422 in the parity storage node 210.

The write processing program 422 receives the parity update request (S1201). The write processing program 422 acquires the exclusion for the address (the address of the parity segment) designated with the received parity update request (S1202).

The write processing program 422 determines based on the storage pool management table 412 and the cluster management table 411 whether or not the address of the parity segment is in the normal state ("Normal") (S1203). When the determination result of S1203 is true (Yes in S1203), the write processing program 422 reads the old parity from the parity segment (drive 214 of the parity storage node 210) (S1206), generates the new parity by using the intermediate data set acquired from the read old parity and the above-described update request (S1207), and writes the generated new parity to the parity segment (S1208).

When the write processing program 422 fails to update the parity (for example, S1208), the write processing program 422 sets the difference bit (difference bit in the user part difference information 802) corresponding to the parity segment of the parity update destination to be valid ("1") (S1210). In addition, the write processing program 422 performs the "OR" operation of the difference bit (the difference bit in the user part difference information 802 and the difference bit from the different node 210) corresponding to each user segment in the stripe including the parity segment of the parity update destination and stores the difference bit (the difference bit in the parity part difference information 803) corresponding to the parity segment of the parity update destination as the "OR" operation result (S1211). It is noted that the write processing program 422 may write the difference information management table 414 from the memory to the drive 214 immediately after performing at least one of S1210 and S1211 (or at the time of a planned stop of the storage system or the own node (for example, at the time of a stop by the user operation)). Accordingly, even though the difference information management table 414 disappears from the memory due to the power failure or the like, the difference information management table 414 can be restored.

When the determination result of S1203 is false (No in S1203), the write processing program 422 determines based on the difference information management table 414 whether or not the difference bit (the difference bit in the user part difference information 802) of the parity segment of the parity update destination is valid ("1") (S1204). When the determination result of S1204 is false (No in S1204), that is, when the parity segment of the parity update destination is not in the normal state but the parity segment is not the difference segment, the drive 214 that is a basis of the parity segment is in the state of being rebuilt, but the parity of the parity segment is rebuild-completed. For this reason, S1206 is performed.

When the determination result of S1204 is true (Yes in S1204), the write processing program 422 sets the update failure to the response to the parity update request received in S1201 (S1205).

After S1211 or S1205, the write processing program 422 releases the exclusion acquired in S1202 (S1212) and returns the response to the parity update request to the transmission source (that is, the different node 210) of the update request (S1213).

Figure 13:
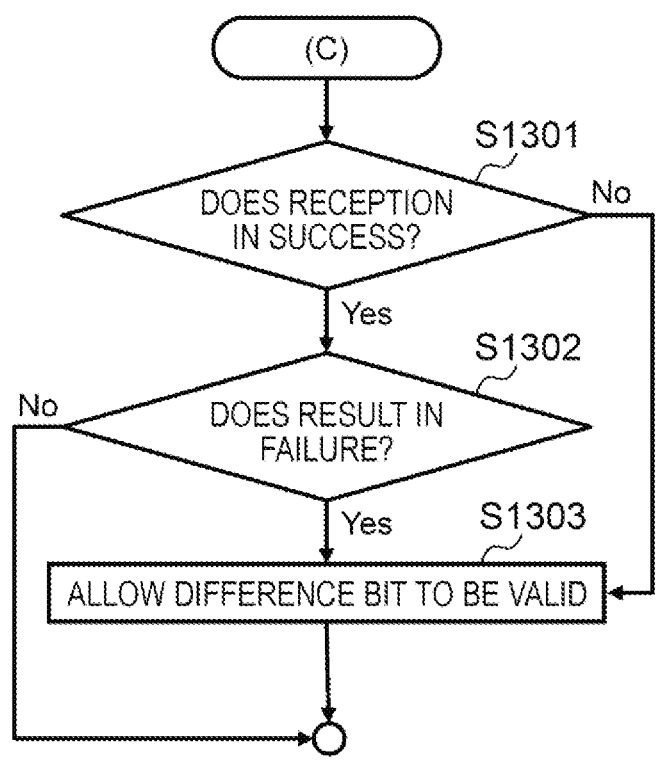
FIG. 13 illustrates a flow of last update result processing performed by the write processing program in the parity storage node.

FIG. 13 illustrates a flow of the last update result processing performed by the write processing program 422 in the parity storage node 210.

When the write processing program 422 fails to receive the notification of the last update result (No in S1301), the write processing program 422 allows the difference bit (the difference bit in the user part difference information 802) of the parity segment of the parity update destination to be valid ("1") (S1303).

The write processing program 422 succeeds in receiving the notification of the last update result (Yes in S1301), and when the notification indicates the failure (Yes in S1302), the write processing program 422 sets the difference bit (the difference bit in the user part difference information 802) of the parity segment of the parity update destination to be valid ("1") (S1303). When the write processing program 422 succeeds in receiving the notification of the last update result (Yes in S1301) and the notification indicates success (No in S1302), the write processing program 422 ends the processing without performing S1303.

Figure 14:
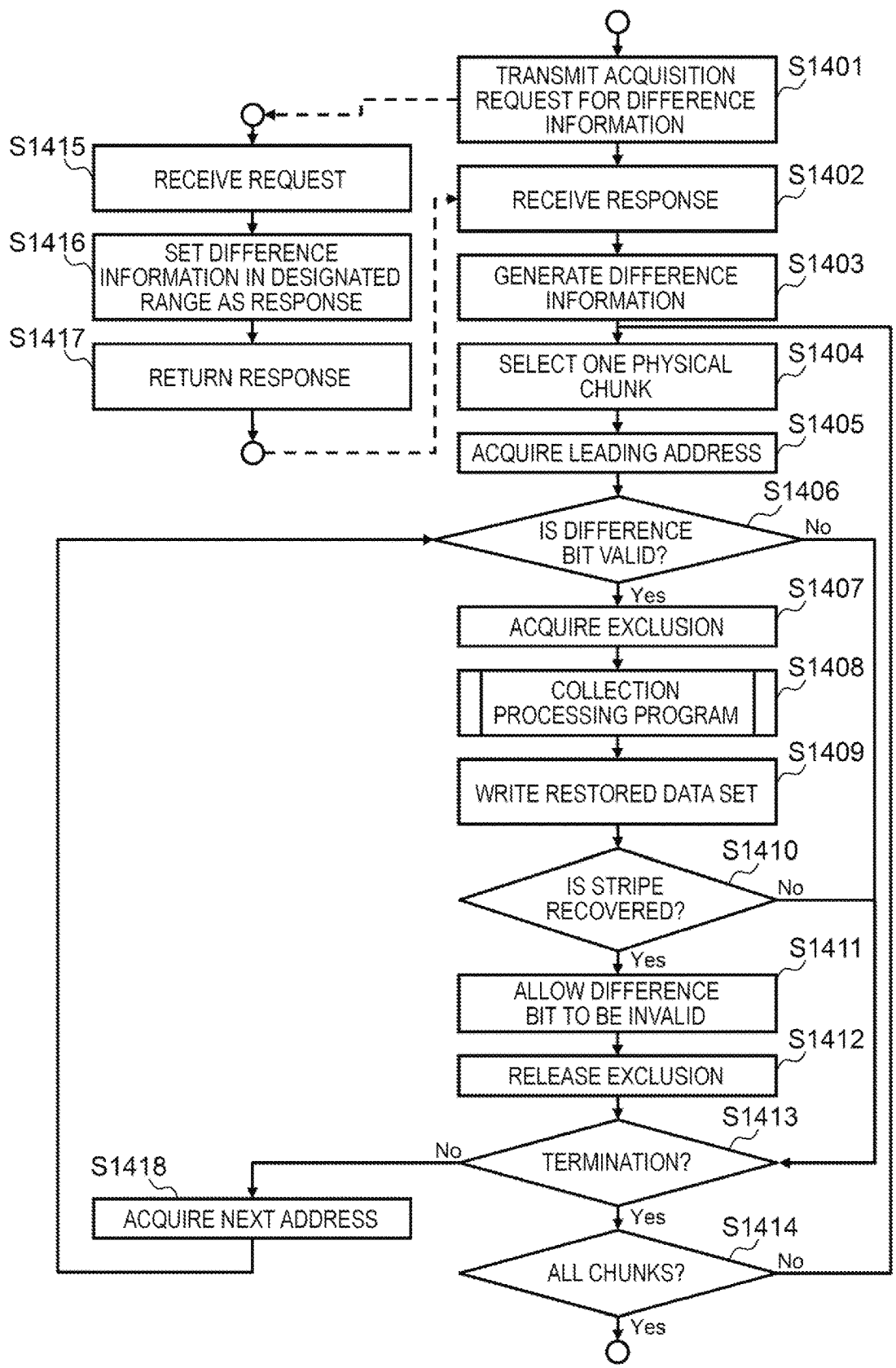
FIG. 14 illustrates a flow of rebuild processing performed by a rebuild processing program.

FIG. 14 illustrates a flow of the rebuild processing performed by the rebuild processing program 424.

The rebuild processing program 424 may be started, for example, when the own node (the node having the rebuild processing program 424) recovers from the failure. The rebuild processing program 424 restores the data set of the segment in which the difference bit is valid for each segment of the own node and writes the data set to the rebuild destination segment. When the state of the entire stripe including the segment in which the difference bit is valid becomes the normal state, the rebuild processing program 424 clears (invalidates) the valid difference bit. Specifically, the rebuild processing is as follows.

The rebuild processing program 424 transmits an acquisition request for the difference information to all different nodes (S1401). In the acquisition request, the acquisition range (for example, at least a portion of the range of at least one physical chunk 311 belonging to the rebuild target area of the own node) of the difference information may be designated. One different node is taken as the example. The rebuild processing program 424 in the different node receives the acquisition request (S1415), acquires the user part difference information 802 in the designated range, sets the user part difference information as the response (S1416), and returns the response (S1417).

The rebuild processing program 424 of the own node receives the response from all the transmission destinations in S1401 (S1402) and generates the difference information (for example, the parity part difference information 803 of the physical chunk 311 belonging to the rebuild target area) of the rebuild target area (S1403).

The rebuild processing program 424 selects one unselected physical chunk 311 in this rebuild processing from the rebuild target area (S1404). The rebuild processing program 424 acquires the leading address of the physical chunk 311 selected in S1404 (S1405).

The rebuild processing program 424 determines whether or not the difference bit (the difference bit in the user part difference information 802 and the parity part difference information 803 of the own node) corresponding to a target segment which is a segment to which the address acquired in S1405 (or S1418 described later) belongs is valid (S1406).

When the determination result of S1406 is true (Yes in S1406), the rebuild processing program 424 acquires the exclusion of the target segment (S1407). The rebuild processing program 424 issues the execution instruction of the collection processing (S1408) to the collection processing program 423. The target segment may be designated in the execution instruction. The details of the collection processing are as described with reference to FIG. 10. The rebuild processing program 424 writes the data set restored in the collection processing (S1408) to a rebuild destination area (S1409).

The rebuild processing program 424 determines based on the cluster management table 411 whether or not all the segments in the stripe including the target segment are recover-completed ("normal") (S1410). When the determination result of S1410 is true (Yes in S1410), the rebuild processing program 424 invalidates ("0") the difference bit corresponding to the target segment (S1411) and releases the exclusion acquired in S1407 (S1412). It is noted that, in S1410, the rebuild processing program 424 may determine whether or not the segment is recovered by inquiring (for example, synchronously inquiring) whether or not the segment is recovered of another node that is rebuilding and having the segment for each segment (portion) in the stripe of the determination target.

After S1412, when the determination result of S1406 is false (No in S1406) or when the determination result of S1410 is false (No in S1410), the rebuild processing program 424 determines based on the parity group management table 413 whether or not the target segment is the segment of the termination of the physical chunk 311 selected in S1404 (S1413). When the determination result of S1413 is false (No in S1413), the rebuild processing program 424 acquires the address of the next segment of the target segment from the physical chunk 311 selected in S1404 (S1418) and performs the determination of S1406.

When the determination result of S1413 is true (Yes in S1413), the rebuild processing program 424 determines whether or not all chunks in the rebuild target area are selected (S1414). When the determination result of S1414 is true (Yes in S1414), the rebuild processing ends. When the determination result of S1414 is false (No in S1414), the process returns to S1404.

Second Embodiment

A second embodiment will be described. At that time, differences from the first embodiment will be mainly described, and the description of the common points with the first embodiment will be omitted or simplified.

When the node 1 receives the write request designating the virtual volume 330 for which the node v has the owner right, the node v stores the user data A accompanying the write request in the drive 214 of the node 1. That is, so-called data locality that the user data input/output according to the I/O request designating the virtual volume 330 for which the node v has the owner right exists in the drive 214 of the node v is maintained.

In order to allow the user data A to be redundant while maintaining such data locality, the node v divides the user data A into the j user data sets, and each of the (j×k) data sets is transmitted to another different node 210. That is, the transmission from the node v to the (j×k) different nodes 210 is performed. In other words, the data transmission amount (number of data sets to be transmitted) for redundancing is (j×k). j is the number of user data sets and is an integer of 2 or more. k is the number of parities and is an integer of 1 or more. For example, when the data protection policy is 2D2P, (j×k)=(2×2)=4. It is noted that, when the size of the user data A is not the integer multiple of the size of the user data set, although the size of a portion of the data obtained from the user data A does not reach the size of the user data set, the user data set of the predetermined size is obtained by adding predetermined data (for example, data of all bits "0") to the data.

In the embodiment, the data transmission amount for allowing user data to be redundant can be reduced while maintaining the data locality. Specifically, the data transmission amount can be reduced to (j+k−1). For example, when the data protection policy is 2D2P, the data transmission amount is reduced to (j+k−1)=(2+2−1)=3.

Figure 15:
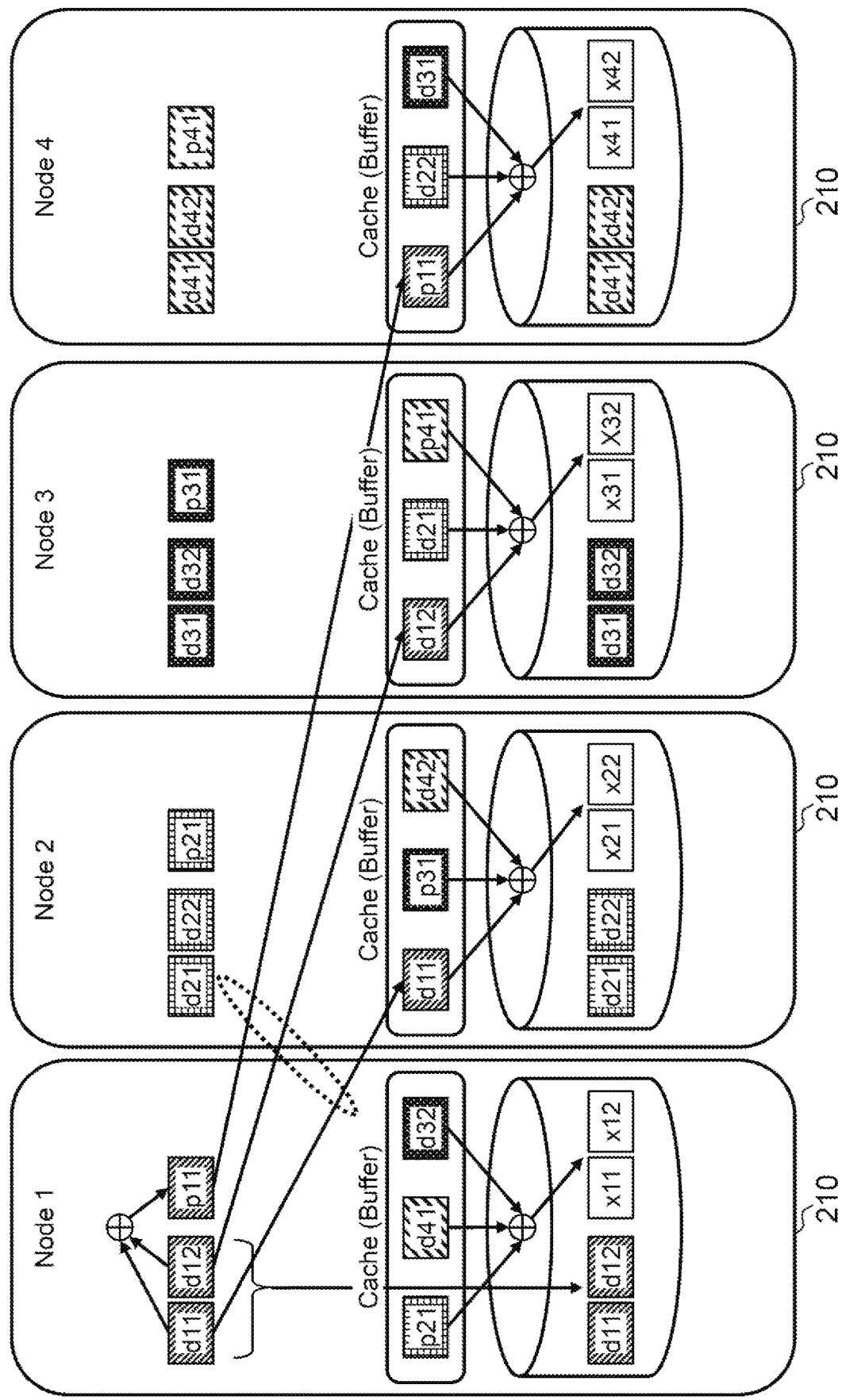
FIG. 15 illustrates an example of an outline of inter-node transmission according to a second embodiment.

FIG. 15 illustrates an example of the outline of inter-node transmission according to the second embodiment.

Each of the four nodes (nodes 1 to 4) protects the data with 2D2P, but the data transmission amount is only 3. The details will be described below. It is noted that a portion of the memory 212 (refer to FIG. 2) of the node 210 is the temporary storage area such as a cache area (or a buffer area). The memory 212 may include a high-speed non-volatile memory device such as an SSD or an NVMe, and an area based on the high-speed non-volatile memory device may be the cache area (or the buffer area).

The write processing program 422 of the node v (v is an arbitrary integer of 1 to 4) divides the received user data of a write target into two user data sets dv1 and dv2 and further generates one parity pv1 as an intra-node redundant code. The parity pv1 is a primary redundant code (Class1 Code).

Next, the write processing program 422 of the node v stores the user data sets dv1 and dv2 in the drive 214 of the node v and transmits the user data sets dv1 and dv2 and the parity pv1 to the cache area of the different node. When it is set that v=1, a user data set d11 is transmitted to the node 2, a user data set d12 is transmitted to the node 3, and a parity p11 is transmitted to the node 4. In this manner, the data transmission amount is 3. It is noted that, at the time when this transmission is completed, the write processing program 422 of the node v may return the response to the write request. Instead, when the transmitted data set is written to the drive 214, the write processing program 422 of the node v may return the response to the write request.

The write processing program 422 of node v is asynchronous with the processing from the reception of the write request to the returning of the response, and the write processing program 422 of node v generates parities xv1 and xv2 which are secondary redundant codes from three data sets (two user data sets and parity) aggregated from three nodes other than the node v, writes the parities xv1 and xv2 to the drive 214 of the node v, and releases the cache area (the area in which the three data sets are stored). The parities xv1 and xv2 are the secondary redundant codes (Class2 Code).

For example, the write processing program 422 of the node 3 generates parities x31 and x32 from the user data set d12 from the node 1, a user data set d21 from the node 2, and a parity p41 from the node 4, writes the parities x31 and x32 to the drive 214 of the node 3, and releases the cache area (the area in which the user data sets d12 and d21 and the parity p41 are stored).

FIG. 15 illustrates an example of the 2D2P redundant configuration, but the method of this example can be applied to any jDkP configuration. That is, the example is as follows.

The write processing program 422 of the node v stores the user data of the write target in the drive 214 of the node v and divides the user data into the j user data sets dv1, . . . , dvj, generates the (k−1) parities pv1, . . . , pv(k−1) based on the j user data sets dv1, . . . , dvj, and transmits each of the (j+k−1) data sets to the different node other than node v. That is, the transmission is performed from the node v to the (j+k−1) nodes other than the node v. The data transmission amount is (j+k−1).

The write processing program 422 of the node v generates the k parities xv1, . . . , xvk based on the (j+k−1) data sets (the j user data sets and the (k−1) parities) from the (j+k−1) nodes other than the node v. The write processing program 422 of the node v stores the k parities xv1, . . . , xvk in the drive 214 of the node v.

In addition, in FIG. 15, the redundant code (Class2 Code) may be updated by read-modify-write (RMW). When the redundant code is updated by the RMW, the processing is as follows.

The write processing program 422 of the node v reads write destination data of user data of the write target and generates intermediate data by performing the "XOR" operation with the write data. Then, the write processing program 422 of the node v stores the write data in the drive 214 of the node v and divides the intermediate data into j intermediate data sets dv1', . . . , dvj', generates the (k−1) intermediate parities pv1, . . . , pv(k−1) based on the j intermediate data sets dv1', . . . , dvj', and transmits each of the (j+k−1) intermediate data sets to the different node other than the node v.

When the write processing program 422 of the node v receives a portion of the intermediate data set, the write processing program 422 reads the k stored parities xv1, . . . , xvk from the drive, calculates new parities xv1', . . . , xvk' of 1 with a portion of the intermediate data set and the k read parities, and stores the new parities in the drive 214 of the node v.

Figure 16:
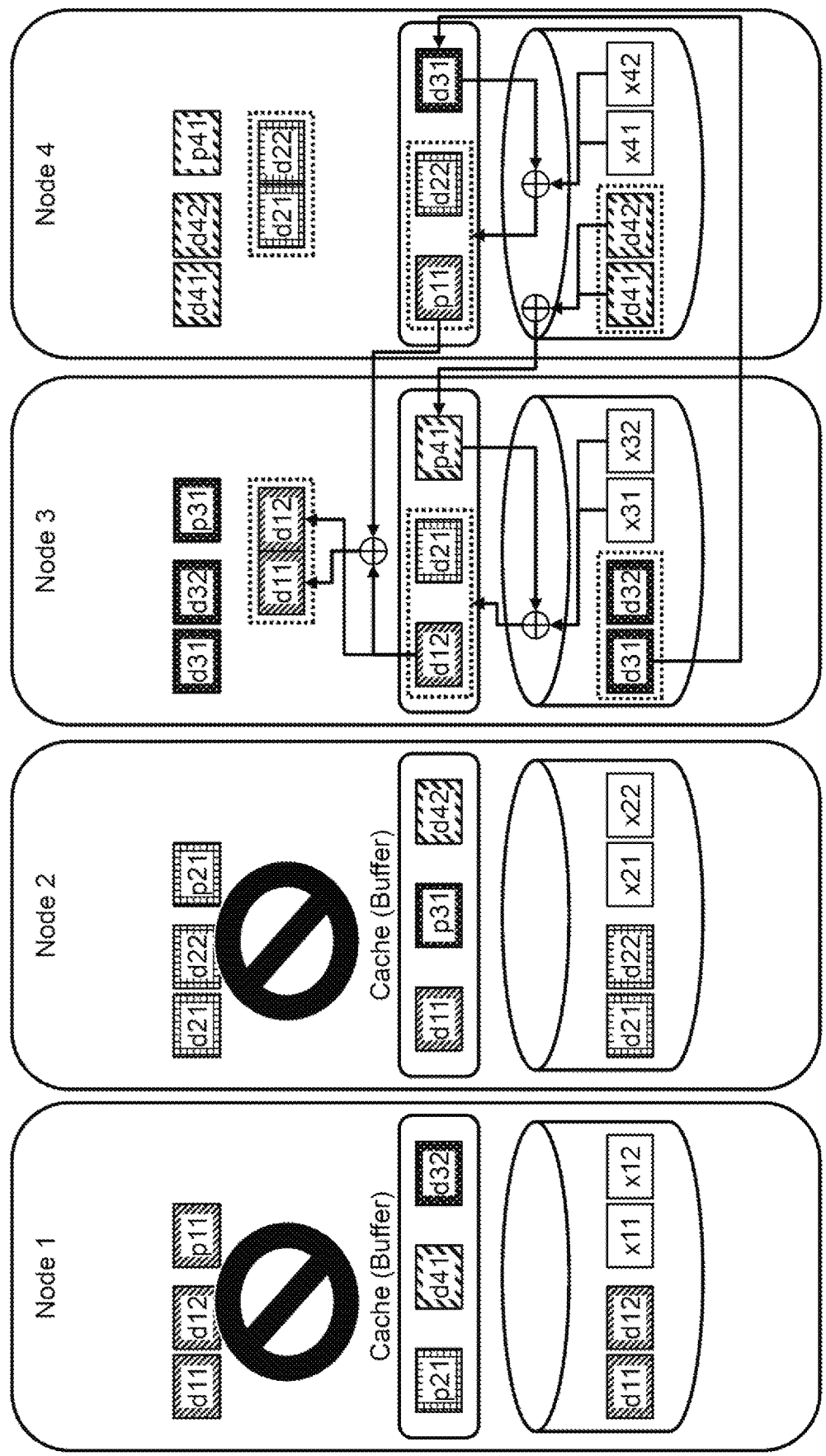
FIG. 16 illustrates an example of an outline of rebuild processing according to the second embodiment.

FIG. 16 illustrates an example of the outline of the collection processing according to the second embodiment.

In the 2D2P, it is assumed that two nodes 1 and 2 having the same number as the redundancy 2 is failed. In this case, in the surviving node 3, the user data sets d11 and d12 existing by the data locality of the failed node 1 are rebuilt, and in the surviving node 4, the user data sets d21 and d22 existing by the data locality of the failed node 2 are collected. The user data sets that exist due to the data locality of any failed node may be collected in any surviving node.

Among the nodes 3 and 4, the node 3 is taken as the example to describe the collection of user data sets d11 and d12.

First, the collection processing program 423 of the node 3 restores the parity p41 (Class1 code) used for generating the parities x31 and x32 (Class2 code). Specifically, the rebuild processing program 424 of the node 3 acquires user data sets d41 and d42 used for generating the parity p41 from the surviving node 4 and restores the parity p41 by using the user data sets d41 and d42 (when the parity p41 remains in the cache area of the node 3, the restoration of the parity p41 may be skipped).

Next, the collection processing program 423 of the node 3 restores the user data sets d12 and d21 used for generating the parities x31 and x32 by using the parities x31 and x32 (Class2 code) and the parity p41. It is noted that, in node 4, the collection processing program 423 of the node 4 acquires a data set d31 existing in the surviving node 3 used for generating parities x41 and x42 from the node 3 and restores the user data set d22 and the parity p11 used for generating the parities x41 and x42 by using the parities x41 and x42 and the data set d31.

Finally, the collection processing program 423 of the node 3 acquires the parity p11 restored in the node 4 from the node 4 and restores the user data set d11 based on the user data set d12 and the parity 11. Accordingly, the user data sets d11 and d12 are rebuilt on the node 3.

In this manner, when the failure occurs in the same number of nodes as the redundancy k, the rebuild processing program 424 of the surviving node v reads the k parities xv in the drive 214 of the surviving node v in each of the {n-k} surviving nodes. In addition, the rebuild processing program 424 of the surviving node v acquires each of the (k−1) data sets (the user data set or the parity) used for generating the k parities xv by acquiring from the surviving node that stores the data set (or the user data set used for generating the data set). The rebuild processing program 424 of the surviving node v restores the j user data sets by using the k read parities xv and the (k−1) acquired data sets. The rebuild processing program 424 of the surviving node v acquires the user data set (the user data set of the rebuild target) of the target failed node from the j restored user data sets and acquires the user data set of the target failed node from another surviving node (or acquires the user data set by acquiring the parity required to restore the user data set).

Figure 17:
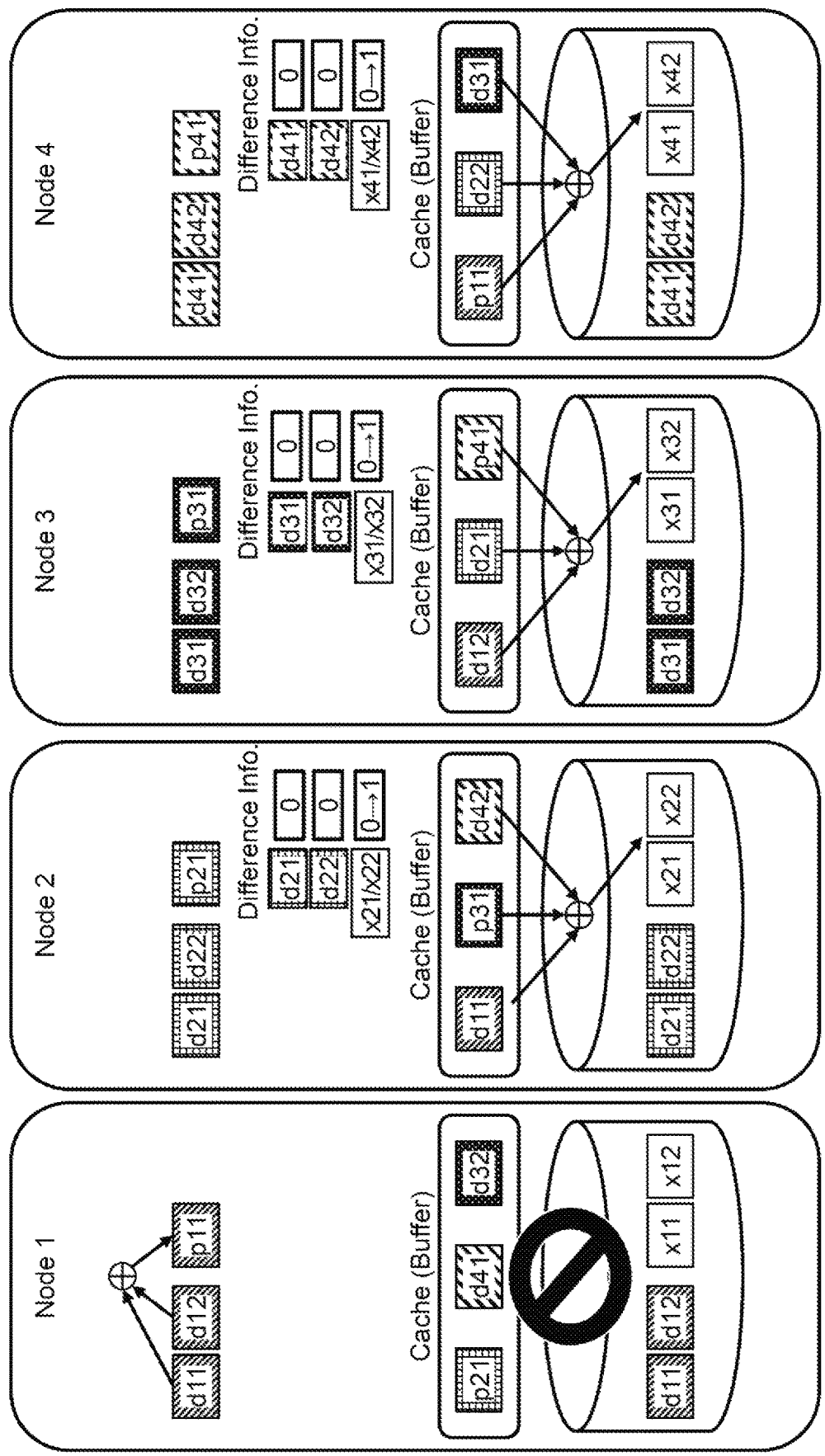
FIG. 17 illustrates an example of difference information management according to the second embodiment.

In such the second embodiment, the difference information is managed as illustrated in FIG. 17. The node 4 is taken as the example as node v. It is noted that the data protection policy is 2D2P (an example of jDkP).

The node 4 retains the difference information having the difference bit for each segment based on the drive 214 of the node 4. The node 4 has the right to update the segment in the node 4.

For each of the two user data sets d41 and d42, the management of the difference bits of the user segment is the same as that in the first embodiment.

On the other hand, the two parities x41 and x42 are stored in the two parity segments, and whether or not each of the two parity segments is the difference segment is managed by one difference bit. Specifically, the parities x41 and x42 are updated by using the parity p11 (Class1 code) generated in the failed node 1, and the parity p11 is generated by using the user data sets d11 and d12. For this reason, the difference bits of the parities x41 and x42 become the "OR" operation results of the difference bits of the user data sets d11, d12, d22, and d31. That is, when any of the user data sets d11, d12, d22, and d31 is updated, all of the parities x41 and x42 are updated, and when the difference bit of any of the user data sets d11, d12, d22, and d31 becomes valid, the difference bits corresponding to the parities x41 and x42 also become valid.

It is noted that clearing (invalidation) of the difference bits corresponding to the parities x41 and x42 is performed when all of the user data sets d11, d12, d22, and d31 are recovered. In addition, in the second embodiment, the storage area group including the user area in which the data sets d11, d12, d21, d22, d31, d32, d41, and d42 are stored is the storage area group as the data protection unit (for example, the stripe).

The above is the description of the second embodiment.

Hereinafter, the description of the first and second embodiments will be summarized. The summary may include the supplementary explanation of the above description or may include the description of the modified example.

Each of the plurality of nodes 210 constituting the storage system 101 includes the processor 211, the memory 212, and the permanent storage device (for example, the plurality of drives 214). With respect to each node 210, there is at least one of the user area and the parity area as the storage area based on the permanent storage device of the node 210. The user area is the storage area in which the user data set is stored. The parity area is the storage area in which the parity is stored. The parity stored in the parity area of the node 210 is generated by using the data set from each of two or more nodes 210 other than the node 210. For example, in the first embodiment, in the node v, the parity is generated by using the user data set from each of two or more nodes 210 other than node v. In the second embodiment, in the node v, the parity x is generated by using the data set (user data set or parity p) from each of the two or more nodes 210 other than the node v.

With respect to the node 210 having the user area, there is the user part difference information 802 including the difference bit (an example of information indicating whether or not to be in the presence of difference) for each user area of the node 210. In the above-described embodiment, the user part difference information 802 (and the parity part difference information 803) exists for each physical chunk, but may exist in the unit other than the physical chunk. For each user area of node 210, the difference bit denotes that update of the user data set of the user area of the node 210 occurs while there is the failed node.

With respect to the node 210 having the parity area, there is the parity part difference information 803 including the difference bit for each parity area of the node 210. With respect to the parity part difference information 803, for each parity area, the difference bit corresponding to the parity area is "1" when there is information indicating the presence of difference for the storage area of any of the data sets used for generating the parity stored in the parity area.

In this manner, with respect to the parity area, there is no need to allow one difference bit determined based on the difference bit of the storage area of the two or more data sets used for generating the parity stored in the parity area, in other words, the difference bits in the storage areas of the two or more data sets to be redundant. As the result, the size of the difference information to be retained by the memory 212 of each node 210 is reduced for the difference rebuild. It is noted that, with respect to each node 210, the difference information (the user part difference information 802 and/or the parity part difference information 803) may be retained in the memory 212 of the node 210 and may be retained in the memories 212 of several nodes 210 other than the node 210.

In addition, when the failure occurs in any of the nodes among the plurality of nodes 210, the difference information (the user part difference information 802 and/or the parity part difference information 803) may be retained in the memory 212 of each node 210 other than the failed node. In other words, when failure does not occur in any of the nodes 210, the difference information needs not to be retained in any of the nodes 210.

In addition, in the above-described embodiment, the example of the failure of the node 210 may be a stop of at least a portion (for example, hardware or software related to writing of data to be I/O target) of the node 210.

With respect to both the user part difference information 802 and the parity part difference information 803, the node 210 that retains the difference information in the memory 212 may update the difference bit "1" out of the difference information to "0" when the data set of the storage area in all the failed nodes out of the storage area group to which the storage area corresponding to the difference bit belongs is restored. In this manner, the difference bit "1" can be updated to "0" indicating the absence of difference at an appropriate timing, which is a timing when all the restored data sets reflecting the after-updating data set for the storage area group are obtained. It is noted that the user part difference information 802 and the parity part difference information 803 may exist for each physical chunk configured with two or more storage areas (for example, two or more segments), and difference bit "1" in the user part difference information 802 and the parity part difference information 803 may be updated to the difference bit "0" in units of a physical chunk. Accordingly, the frequency of clearing (resetting to "0") the difference bit can be appropriately reduced.

When the failed node 210 is recovered from the failure, for each of the plurality of storage areas of the recovered node 210 which is the node recovered from the failure, the difference bit corresponding to the storage area is set to "1" when at least one storage area among the two or more storage areas other than the storage area out of the storage area group to which the storage area belongs has the difference bit "1", and the recovered node may restore the data set for each storage area corresponding to the difference bit "1" among the plurality of storage areas of the recovered node 210. In this manner, even when the size of the difference information to be retained by the memory 212 of each node 210 is reduced, the difference rebuild is possible.

Each node 210 may write the difference information (user part difference information 802 and/or parity part difference information 803) in the memory 212 of the node 210 from the memory 212 of the node 210 to the permanent storage device of the node 210 at the specific trigger. Accordingly, since the difference information on the memory 212 is backed up in the permanent storage device, even though at least a portion of the difference information is lost from the memory 212 due to the power failure or the like, the lost information can be restored from the permanent storage device. With respect to each node 210, the "specific trigger" may be the time of update of the difference information of the node 210 or the time of a planned stop of the node 210.

Accordingly, it is possible to back up at the appropriate timing. The unit of backup may be a portion (for example, only the updated part) or all of the difference information.

The memory 212 of the node 210 having the parity area may retain the parity part difference information 803 including the difference bits for each parity area of the node 210. Accordingly, the destination of the data set required for generating the parity and the notification destination of the difference bit corresponding to the parity area in which the parity is stored become the same node 210. As the result, transmission efficiency is improved.

For example, in the first embodiment, the data protection policy of the stripe may be jDkP (j is an integer of 2 or more and k is an integer of 1 or more). The stripe may be configured with the j user areas and the k parity areas. Any one of nodes among the (j+k) or more nodes configured with the j nodes having the j user areas and the k nodes having the k parity areas may be the failed node. Each of the surviving nodes, which is the node other than the failed node among the (j+k) or more nodes, may store the data set in the storage area of the write destination. The difference bit corresponding to the storage area of the write destination may be "1". When the recovered node recovered from the failure may update the difference bit corresponding to the parity area to "1" when the difference bit of at least one user area in the stripe including the parity area for each parity area of the recovered node is "1". When the difference bit corresponding to the parity area is "1", the recovered node may restore the parity in the parity area based on the user data set in the data other than the recovered node.

The memory 212 of the node 210 having the user area may retain the user part difference information 802 including the information for each user area of the node 210. Accordingly, when the user area of the node 210 is updated, the user part difference information 802 can be updated quickly. In addition, each of the plurality of nodes 210 may provide the volume 330 and store all the user data sets obtained from the user data accompanying the write request designating the volume 330 in the permanent storage device of the node 210. Accordingly, each node 210 can perform inputting/outputting of the user data to/from the area for which the node 210 has the owner right at the high speed.

For example, in the second embodiment, the data protection policy is jDkP (j is an integer of 2 or more and k is an integer of 1 or more), and the node v may perform the following. Accordingly, it is possible to both reduce the difference information and reduce the data transmission amount.

The node v stores the j user data sets obtained from the user data of the write target in the permanent storage device of the node v. The node v generates (k−1) primary parities, which are the (k−1) parities, by using the j user data sets. The node v transmits the (j+k−1) data sets (the j user data sets and the (k−1) primary parities) to the (j+k−1) nodes other than the node v.

The node v generates k secondary parities which are the k parities by using the (j+k−1) data sets obtained from the (j+k−1) nodes 210 other than the node v. This "(j+k−1) data sets" is a set including the j user data sets that do not include the user data set of the node v and the (k−1) parities that do not include the parity of the node v. The node v stores the k secondary parities in the permanent storage device of the node v. When the difference bit is "1" for the storage area of any of the data sets among the (j+k−1) data sets used for generating the k secondary parities, the node v updates the difference bit common to the k parity areas in which the k secondary parities are stored out of the parity part difference information 803 of the node v to the information indicating the presence of difference.

In addition, the data protection policy is jDkP (j is an integer of 2 or more and k is an integer of 1 or more), and the intermediate data set may be used as follows. It is noted that the following description is the matter that can be derived by referring to, for example, FIG. 3 and FIGS. 15 to 17.

The node v stores the j user data sets obtained from the user data of the write target in the permanent storage device of the node v. The node v generates (k−1) primary intermediate parities which are the (k−1) intermediate parities by using the j intermediate data sets calculated by the j user data sets and the j old user data sets stored in the write destination of the j user data sets. The node v transmits the (j+k−1) data sets (the j intermediate data sets and the (k−1) primary intermediate parities) to the (j+k−1) nodes other than the node v.

The node v reads the k old secondary parities corresponding to the write destination of the k new secondary parities based on the (j+k−1) data sets obtained from the (j+k−1) nodes 210 other than the node v. This "(j+k−1) data sets" is the set including the j intermediate data sets that do not include the intermediate data set of the node v and the (k−1) intermediate parities that do not include the primary intermediate parity of the node v. The node v generates k new secondary parities, which are the k parities, by using k old secondary parities and the (j+k−1) received data sets and stores the k new secondary parities in the permanent storage device of the node v. When the difference bit is "1" for the storage area of any of the data sets among the (j+k−1) data sets used for generating the k secondary parities, the node v updates the difference bit common to the k parity areas in which the k secondary parities are stored out of the parity part difference information 803 of the node v to the information indicating the presence of difference.

It is noted that, with respect to the parity part difference information 803 of the node 210 having the parity area, when the difference bit is "1" for the storage area of any of the data sets used for generating the parity stored in the parity area for each parity area, the difference bit corresponding to the parity area may be "1".

It is noted that, for example, the following expressions may be made regarding the locality of the difference information below.

Expression Example

A storage system includes a plurality of nodes, each having a processor, a memory, and a permanent storage device, wherein, for each of the plurality of nodes, there is difference information including information indicating whether or not to be in presence of difference for each storage area based on the permanent storage device of the node, and the difference information is retained in the memory of the node.

Also in this expression example, the difference information may be stored in the permanent storage device from the memory at the above-mentioned specific trigger. In addition, with respect to each storage area of the recovered node, difference presence/absence information (the information indicating whether or not to be in the presence of difference) of the storage area may be set to be the information indicating the presence of difference when the difference presence/absence information of at least one storage areas among the storage areas other than the storage area out of the storage area group to which the storage area belongs indicates the presence of difference.

Although several embodiments are described above, these are examples for the purpose of describing the present invention, and the scope of the present invention is not limited to these embodiments. The present invention can also be executed in various other forms.

What is claimed is:

1. A storage system, comprising:
a plurality of nodes, each having a processor, a memory, and a permanent storage device,
wherein, for each of the plurality of nodes,
as a storage area based on the permanent storage device of the node, there is at least one of a user area being a storage area storing a user data set as a data set and a parity area being a storage area storing a parity as a data set,
wherein the parity stored in the parity area of the node is a data set generated by using the data set from each of the two or more nodes other than the node,
wherein, for the node having the user area, there is user part difference information including information indicating whether or not to be in presence of difference for each user area of the node,
wherein, for each user area, the presence of difference denotes that update of the user data set of the user area of the node occurs while there is a failed node being a node in which the failure occurs,
wherein, for the node having the parity area, there is parity part difference information including the information indicating whether or not to be in the presence of difference for each parity area of the node,
wherein, with respect to the parity part difference information, for each parity area, the information corresponding to the parity area is information indicating the presence of difference when there is the information indicating the presence of difference for the storage area of any of the data sets used for generating the parity stored in the parity area, and
wherein, for both the user part difference information and the parity part difference information, the node retaining the difference information in the memory updates the information indicating the presence of difference out of the difference information to information indicating absence of difference when the data sets of the storage areas in all the failed nodes are restored out of a storage area group to which the storage areas corresponding to the information belong.

2. The storage system according to claim 1,
wherein, for each of the plurality of nodes, the node has a plurality of physical chunks, each being configured with the two or more storage areas,
wherein each of the user part difference information and the parity part difference information exists for each physical chunk, and
wherein the update to the information indicating the absence of difference is performed in units of a physical chunk.

3. The storage system according to claim 1,
wherein, when the failed node is recovered from the failure,
wherein, for each of the plurality of storage areas of a recovered node being the node recovered from the failure, the information corresponding to the storage area is set as the information indicating the presence of difference when at least one storage area among two or more storage areas other than the storage area out of the storage area group to which the storage area belongs is in the presence of difference, and wherein, among the plurality of storage areas of the recovered node, for each storage area with the presence of difference, the recovered node restores the data set.

4. The storage system according to claim 1, wherein each of the plurality of nodes writes the difference information of the node from the memory of the node to the permanent storage device of the node at a specific trigger.

5. The storage system according to claim 4, wherein, for each of the plurality of nodes, the specific trigger is a time of the update of the difference information of the node or a time of a planned stop of the node.

6. The storage system according to claim 1, wherein the memory of the node having the parity area retains the parity part difference information including the information for each parity area of the node.

7. The storage system according to claim 1, wherein the memory of the node having the user area retains the user part difference information including the information for each user area of the node.

8. The storage system according to claim 7, wherein each of the plurality of nodes:
provides a volume; and
stores all the user data sets obtained from the user data accompanying a write request designating the volume in the permanent storage device of the node.

9. A storage system comprising:
a plurality of nodes, each having a processor, a memory, and a permanent storage device,
wherein, for each of the plurality of nodes,
as a storage area based on the permanent storage device of the node, there is at least one of a user area being a storage area storing a user data set as a data set and a parity area being a storage area storing a parity as a data set,
wherein the parity stored in the parity area of the node is a data set generated by using the data set from each of the two or more nodes other than the node,
wherein, for the node having the user area, there is user part difference information including information indicating whether or not to be in presence of difference for each user area of the node,
wherein, for each user area, the presence of difference denotes that update of the user data set of the user area of the node occurs while there is a failed node being a node in which the failure occurs,
wherein, for the node having the parity area, there is parity part difference information including the information indicating whether or not to be in the presence of difference for each parity area of the node,
wherein, with respect to the parity part difference information, for each parity area, the information corresponding to the parity area is information indicating the presence of difference when there is the information indicating the presence of difference for the storage area of any of the data sets used for generating the parity stored in the parity area,
wherein a data protection policy of a stripe is jDkP (j is an integer of 2 or more and k is an integer of 1 or more),
wherein the stripe is configured with the j user areas and the k parity areas,
wherein any one among the (j+k) or more nodes configured with the j nodes having the j user areas and the k nodes having the k parity areas is the failed node being the node in which the failure occurs,
wherein each of surviving nodes being nodes other than the failed node among the (j+k) or more nodes stores the data set in the storage area of a write destination,
wherein the information corresponding to the storage area of the write destination becomes the information indicating the presence of difference, and
wherein, for each parity area of the recovered node being the node that recovered from the failure, the recovered node,
updates the information corresponding to the parity area to the information indicating the presence of difference when the information corresponding to at least one user area in the stripe including the parity area is the information indicating the presence of difference, and
restores the parity in the parity area based on the user data set in the data other than the recovered node when the information corresponding to the parity area indicates the presence of difference.

10. A storage system comprising:
a plurality of nodes, each having a processor, a memory, and a permanent storage device,
wherein, for each of the plurality of nodes,
as a storage area based on the permanent storage device of the node, there is at least one of a user area being a storage area storing a user data set as a data set and a parity area being a storage area storing a parity as a data set,
wherein the parity stored in the parity area of the node is a data set generated by using the data set from each of the two or more nodes other than the node,
wherein, for the node having the user area, there is user part difference information including information indicating whether or not to be in presence of difference for each user area of the node,
wherein, for each user area, the presence of difference denotes that update of the user data set of the user area of the node occurs while there is a failed node being a node in which the failure occurs,
wherein, for the node having the parity area, there is parity part difference information including the information indicating whether or not to be in the presence of difference for each parity area of the node,
wherein, with respect to the parity part difference information, for each parity area, the information corresponding to the parity area is information indicating the presence of difference when there is the information indicating the presence of difference for the storage area of any of the data sets used for generating the parity stored in the parity area,
wherein a data protection policy is jDkP (j is an integer of 2 or more and k is an integer of 1 or more), and
wherein the node:
stores the j user data sets obtained from the user data which is a write target in the permanent storage device of the node,
generates (k−1) primary parities which are the (k−1) parities by using the j user data sets,
transmits the (j+k−1) data sets of the j user data sets and the (k−1) parities to the (j+k−1) nodes other than the node,
generates k secondary parities which are the k parities by using the (j+k−1) data sets obtained from the (j+k−1) nodes other than the node and being a set including the j user data sets which do not include the user data set of the node and the (k−1) parities which do not include the parity of the node, stores the k secondary parities in the permanent storage device of the node, and updates information common to the k parity areas in which the k secondary parities are stored out of the parity part difference information of the node to the information indicating the presence of difference when there is the information indicating the presence of difference in the storage area of any of the data sets among the (j+k−1) data sets used for generating the k secondary parities.

11. A storage system comprising:

a plurality of nodes, each having a processor, a memory, and a permanent storage device, wherein, for each of the plurality of nodes, as a storage area based on the permanent storage device of the node, there is at least one of a user area being a storage area storing a user data set as a data set and a parity area being a storage area storing a parity as a data set, wherein the parity stored in the parity area of the node is a data set generated by using the data set from each of the two or more nodes other than the node, wherein, for the node having the user area, there is user part difference information including information indicating whether or not to be in presence of difference for each user area of the node, wherein, for each user area, the presence of difference denotes that update of the user data set of the user area of the node occurs while there is a failed node being a node in which the failure occurs, wherein, for the node having the parity area, there is parity part difference information including the information indicating whether or not to be in the presence of difference for each parity area of the node, wherein, with respect to the parity part difference information, for each parity area, the information corresponding to the parity area is information indicating the presence of difference when there is the information indicating the presence of difference for the storage area of any of the data sets used for generating the parity stored in the parity area, wherein a data protection policy is jDkP (j is an integer of 2 or more and k is an integer of 1 or more), and wherein the node:

stores the j user data sets obtained from the user data which is a write target in the permanent storage device of the node, generates (k−1) primary intermediate parities which are (k−1) intermediate parities by using j intermediate data sets calculated by the j user data sets and j old user data sets stored in a write destination of the j user data sets, transmits the (j+k−1) data sets of the j intermediate data sets and the (k−1) primary intermediate parities to the (j+k−1) nodes other than the node, generates k secondary parities which are the k parities by using the (j+k−1) data sets obtained from the (j+k−1) nodes other than the node and being a set including the j intermediate data sets which do not include the intermediate data set of the node and the (k−1) primary intermediate parities which do not include the primary intermediate parity of the node, stores the k secondary parities in the permanent storage device of the node, and updates information common to the k parity areas in which the k secondary parities are stored out of the parity part difference information of the node to the information indicating the presence of difference when there is the information indicating the presence of difference in the storage area of any of the data sets among the (j+k−1) data sets used for generating the k secondary parities.

* * * * *